Dec. 20, 1966  A. P. MULLERY ETAL  3,293,615
CURRENT ADDRESSING SYSTEM
Filed June 3, 1963   15 Sheets-Sheet 2
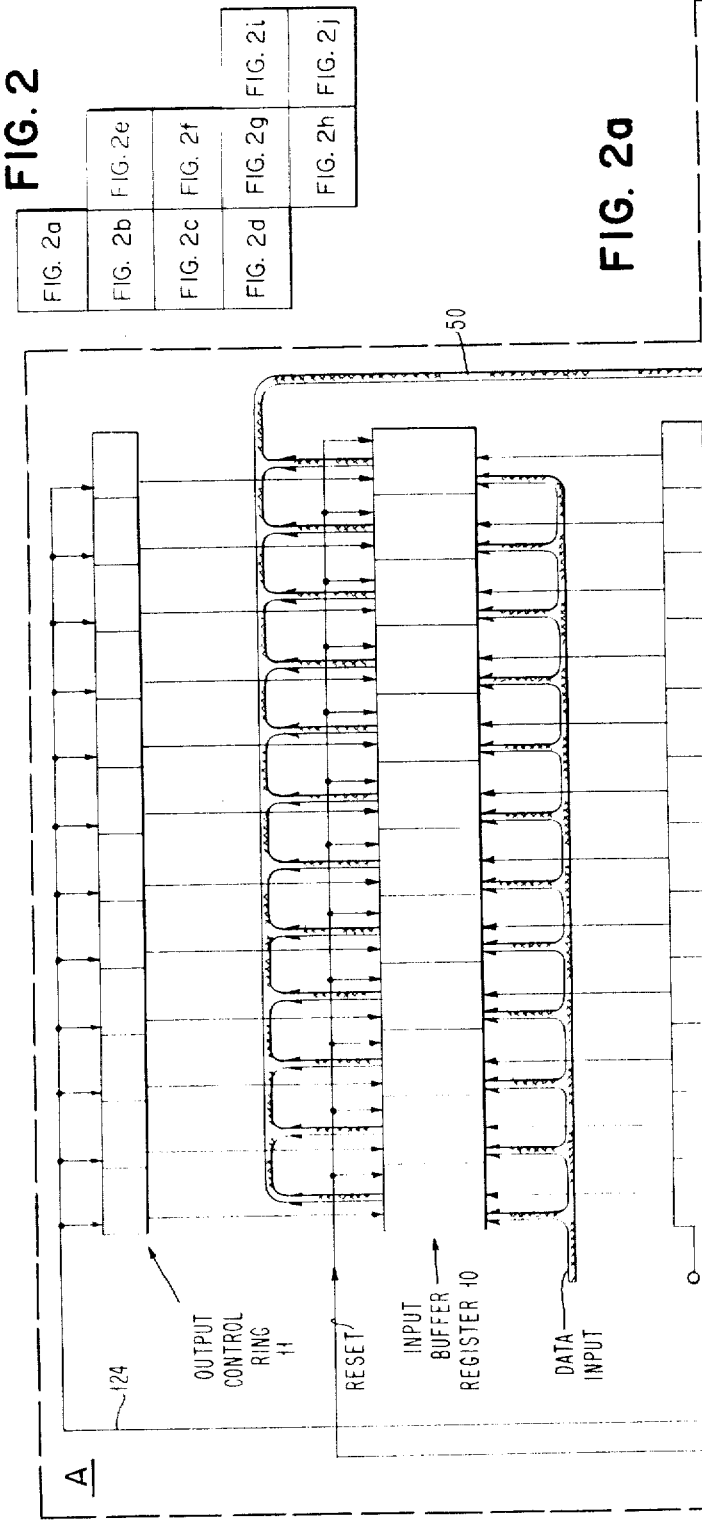
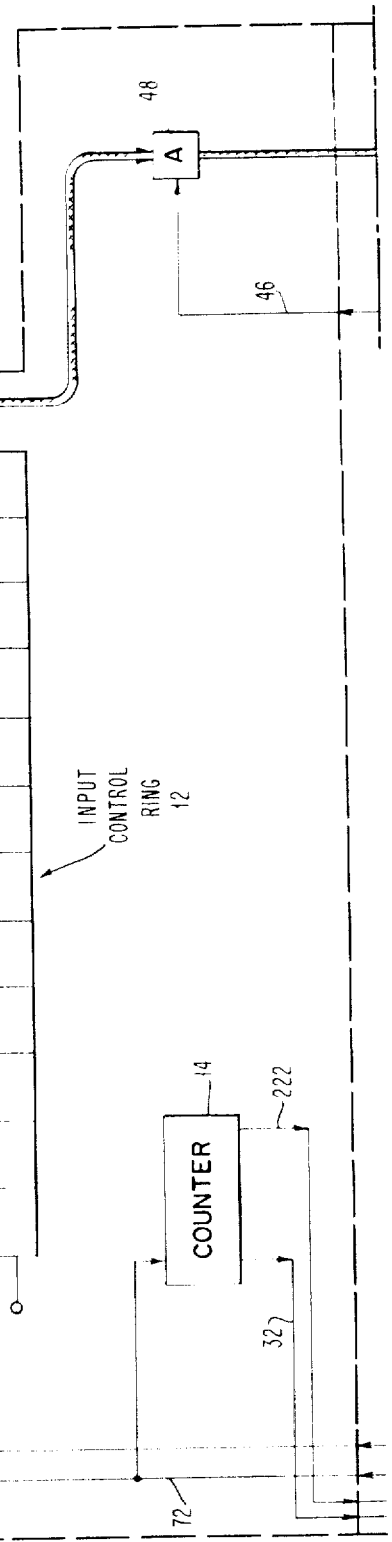

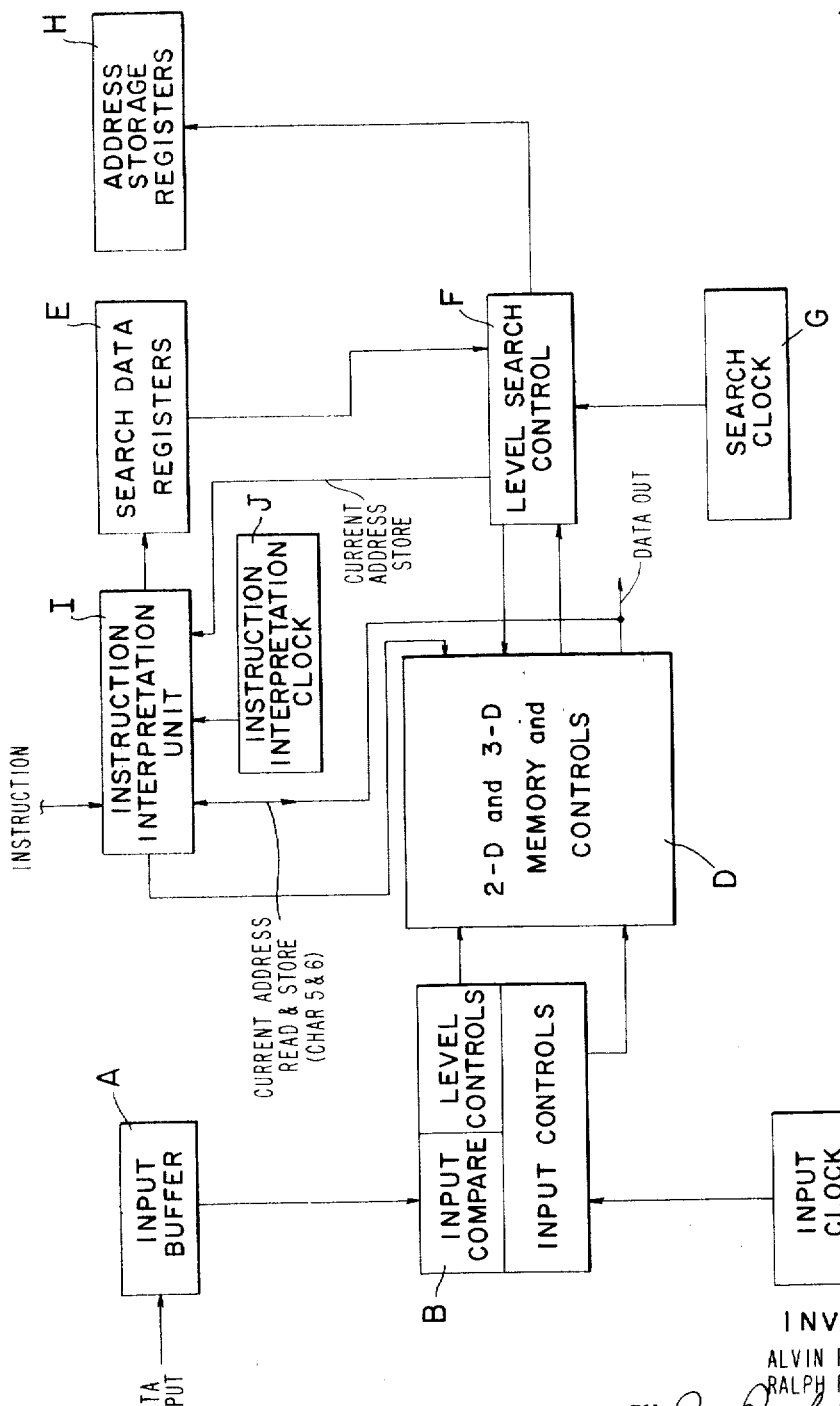

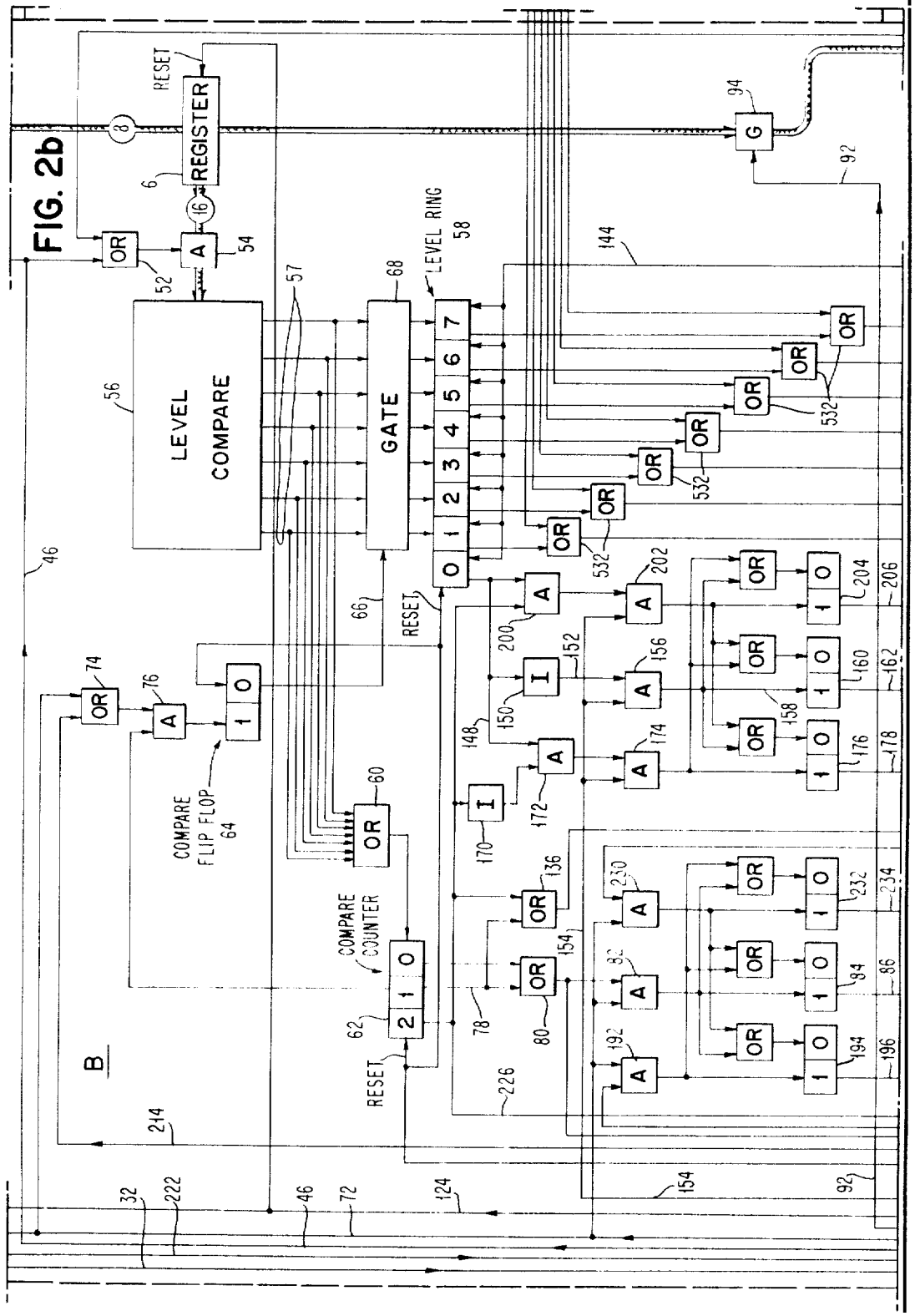

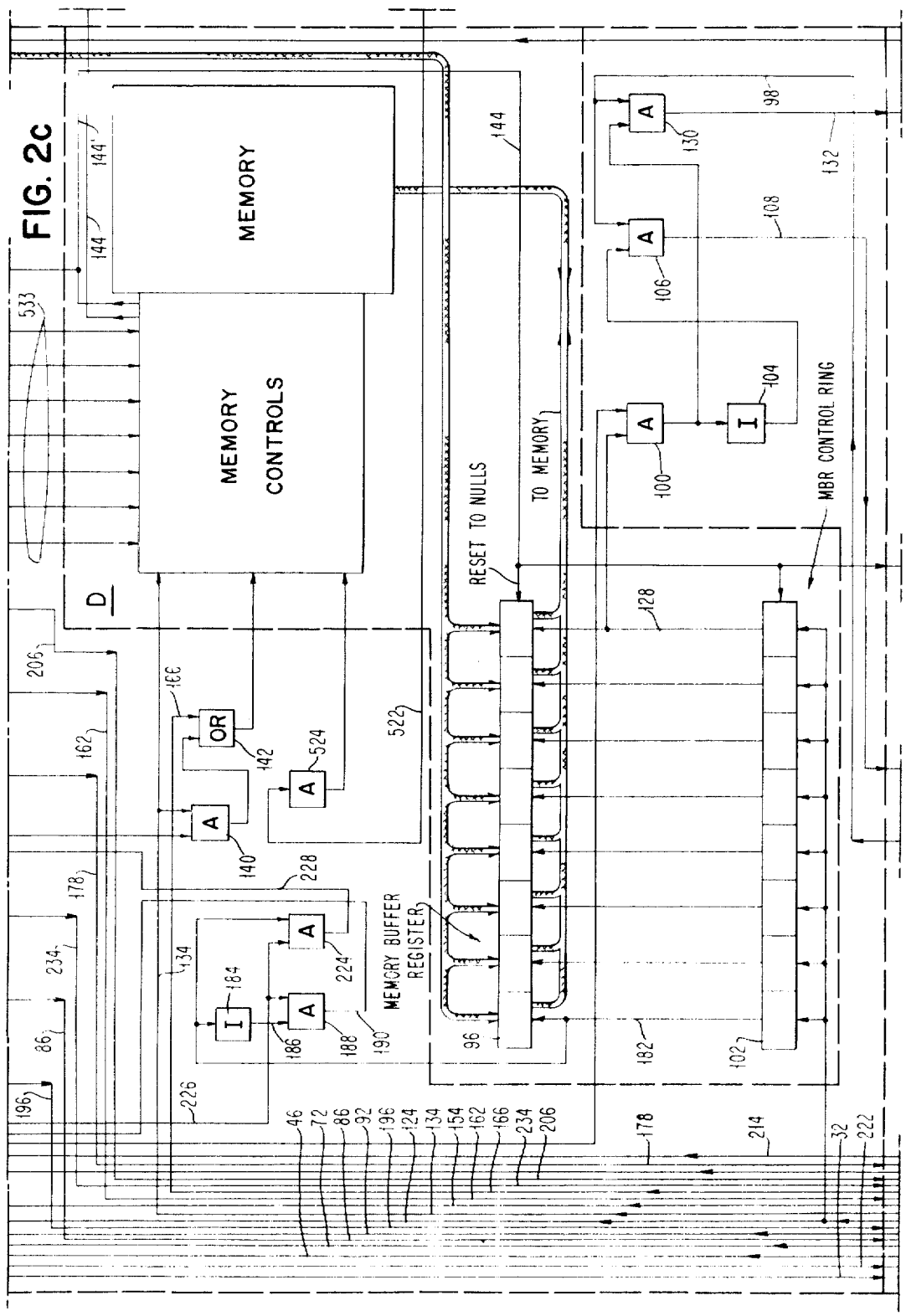

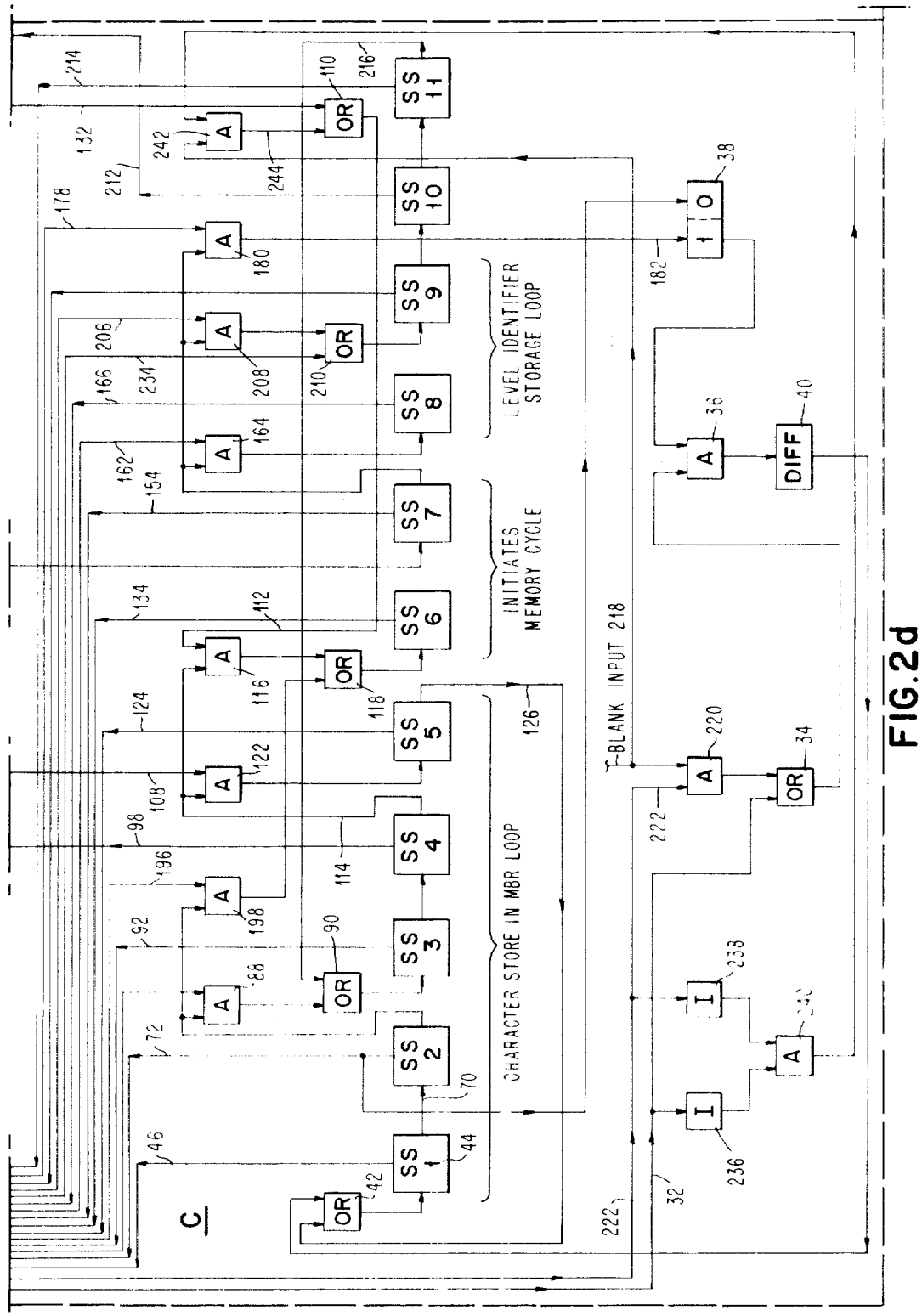

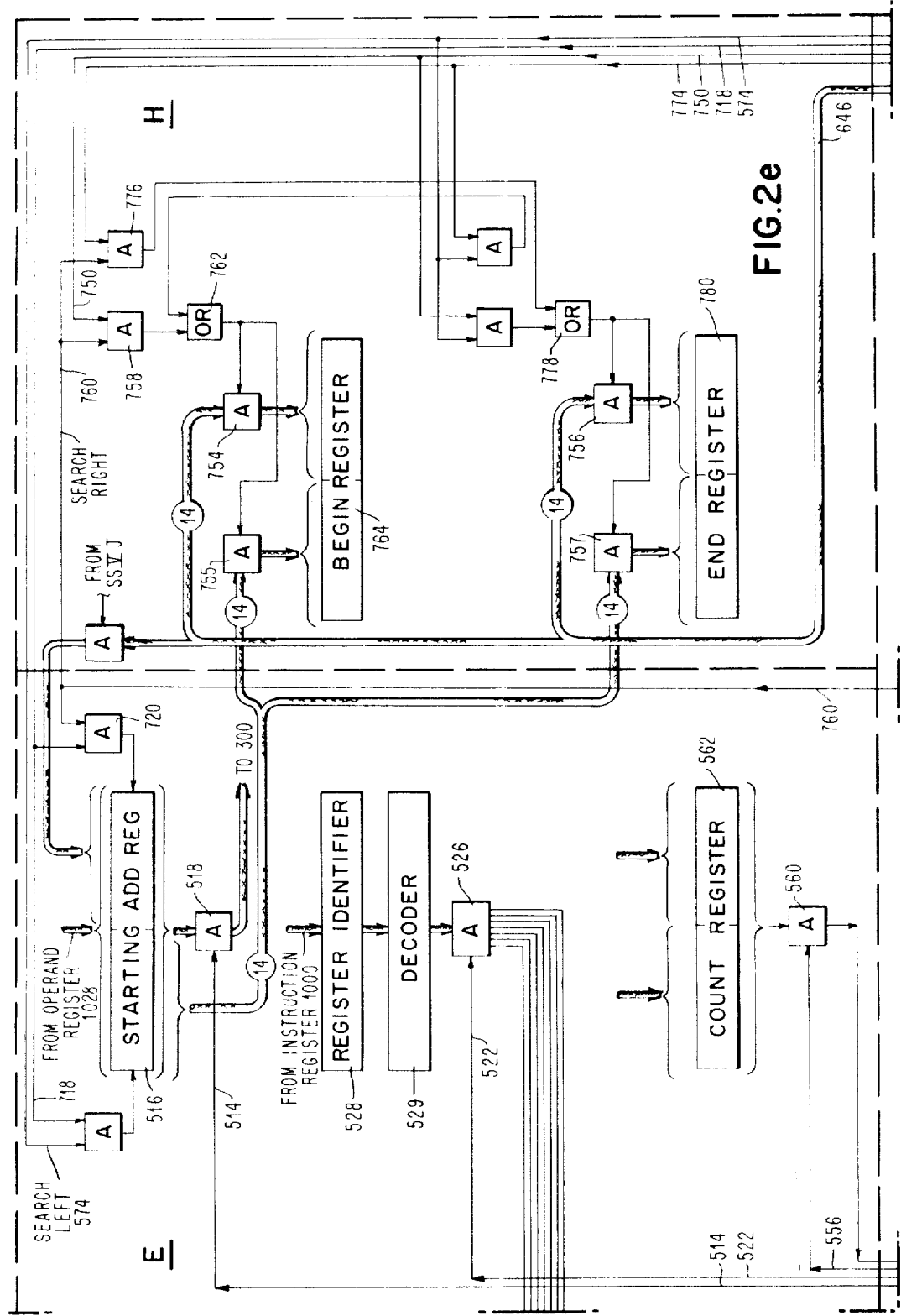

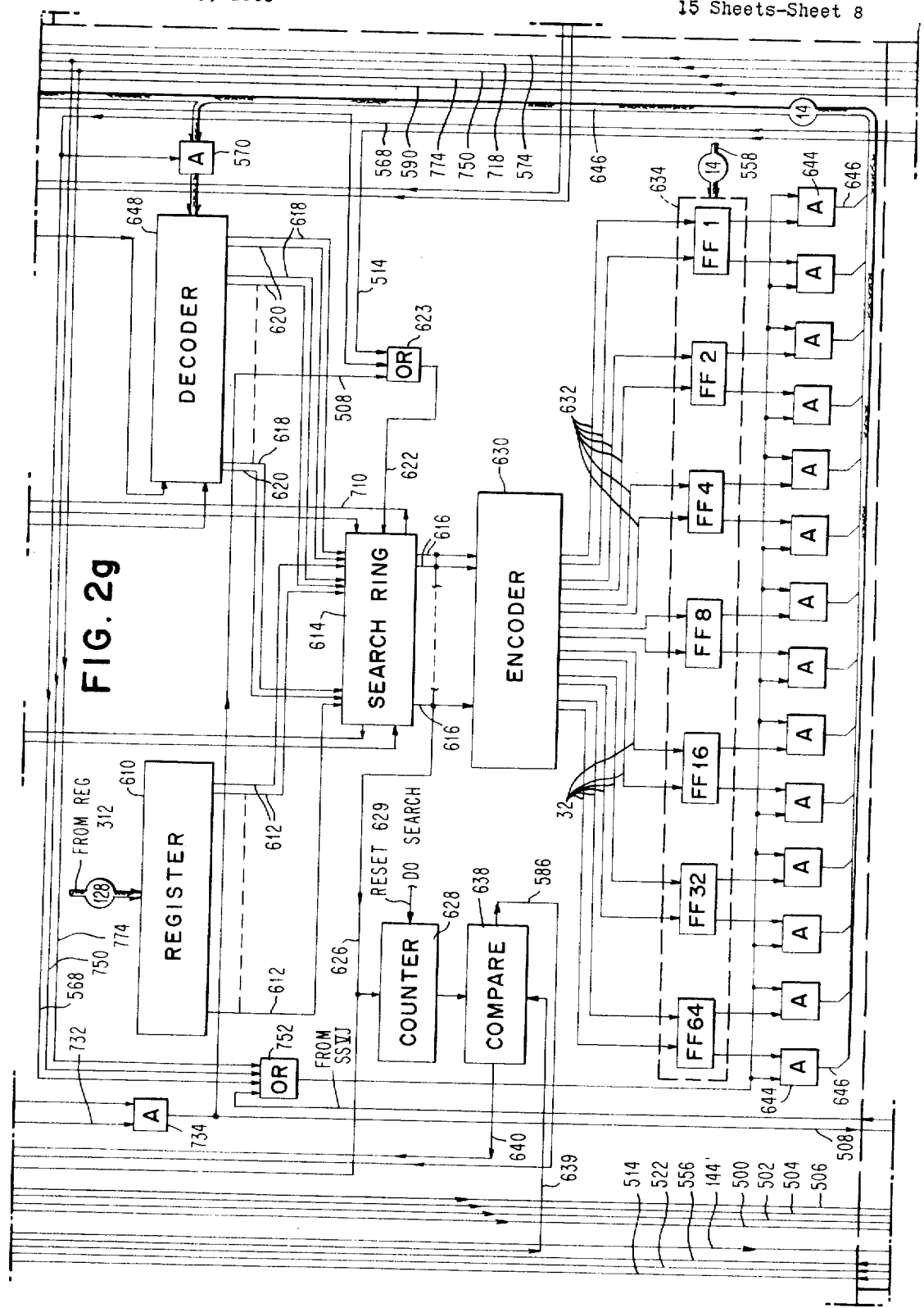

Dec. 20, 1966  A. P. MULLERY ETAL  3,293,615
CURRENT ADDRESSING SYSTEM
Filed June 3, 1963  15 Sheets-Sheet 10

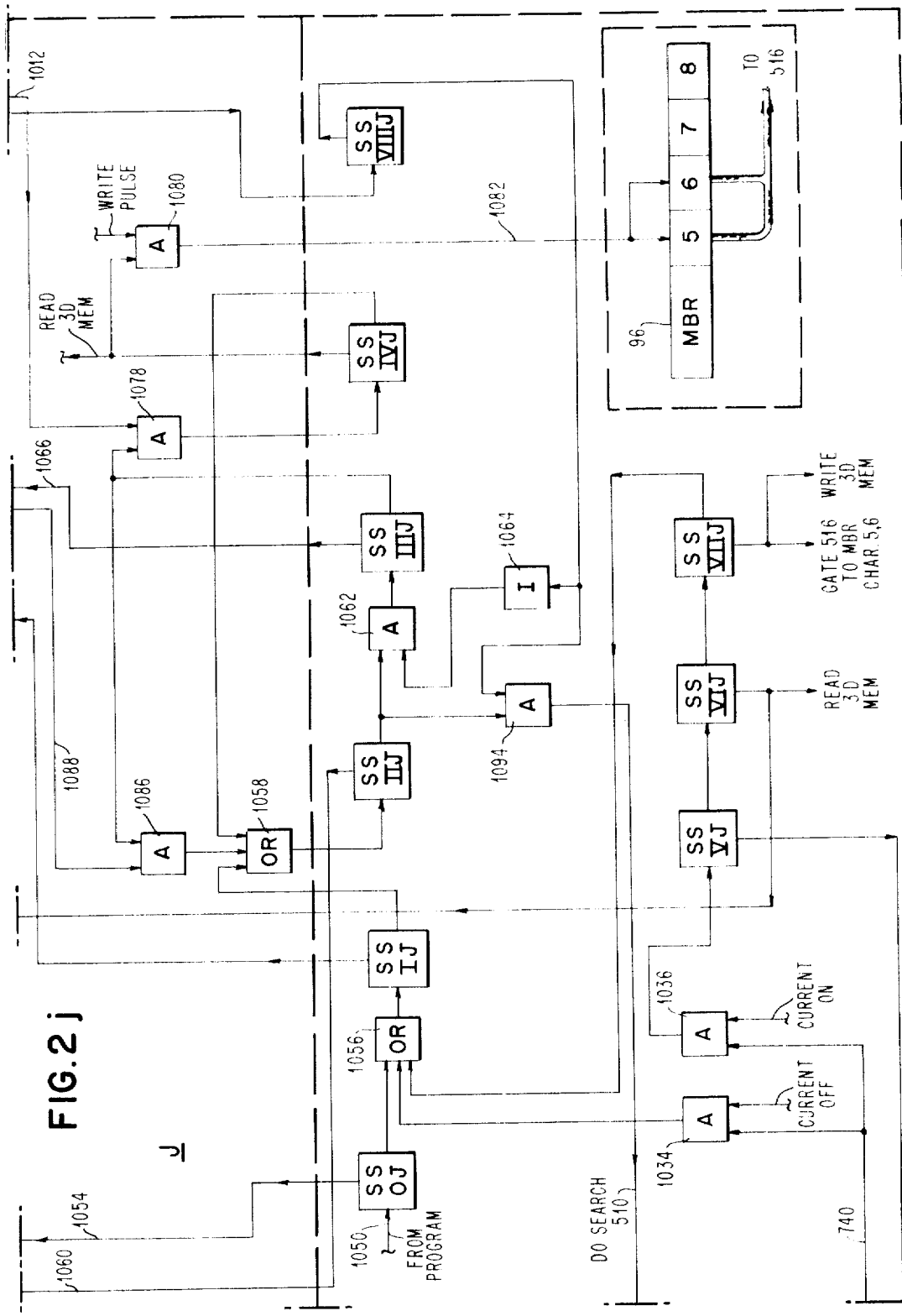

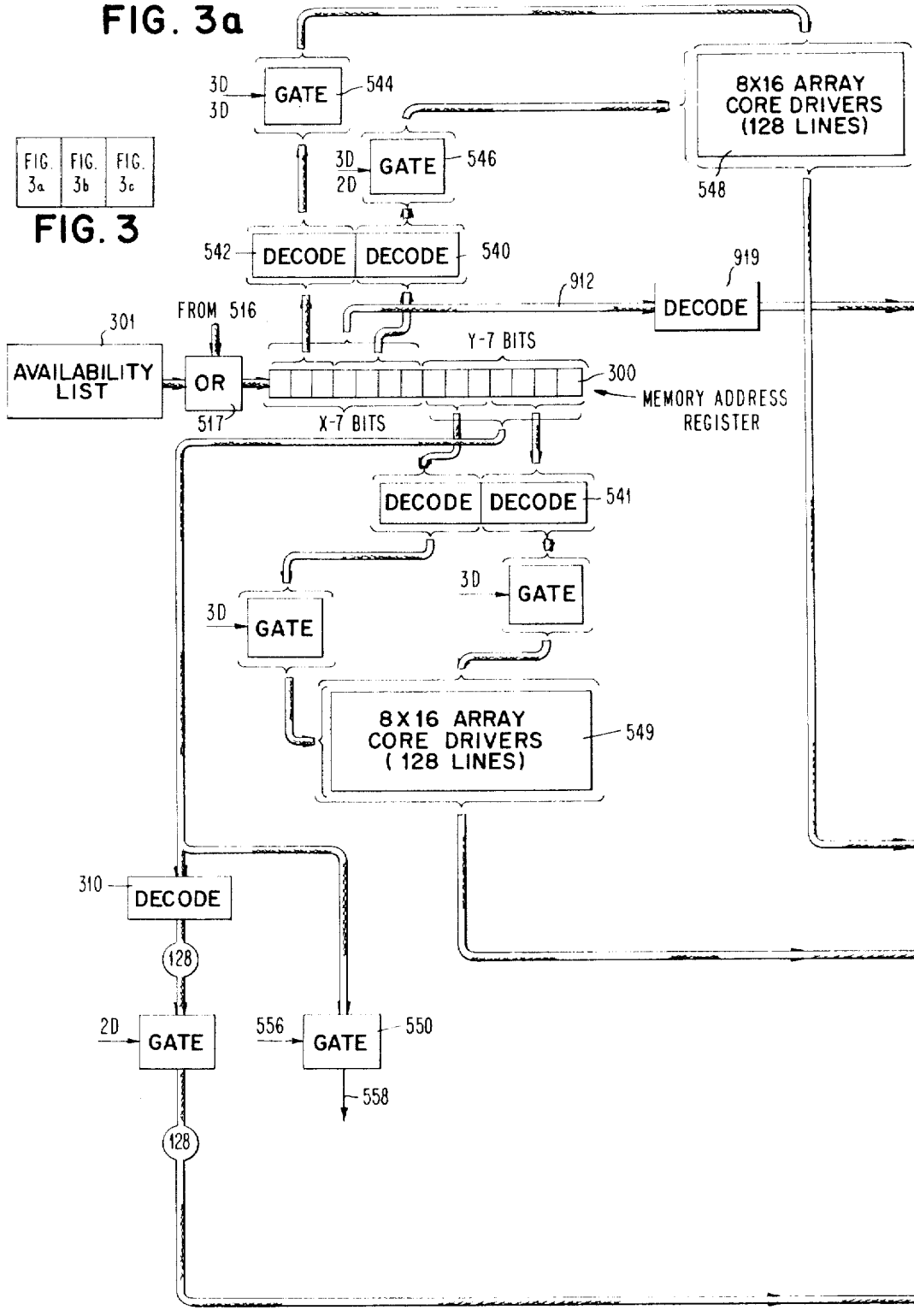

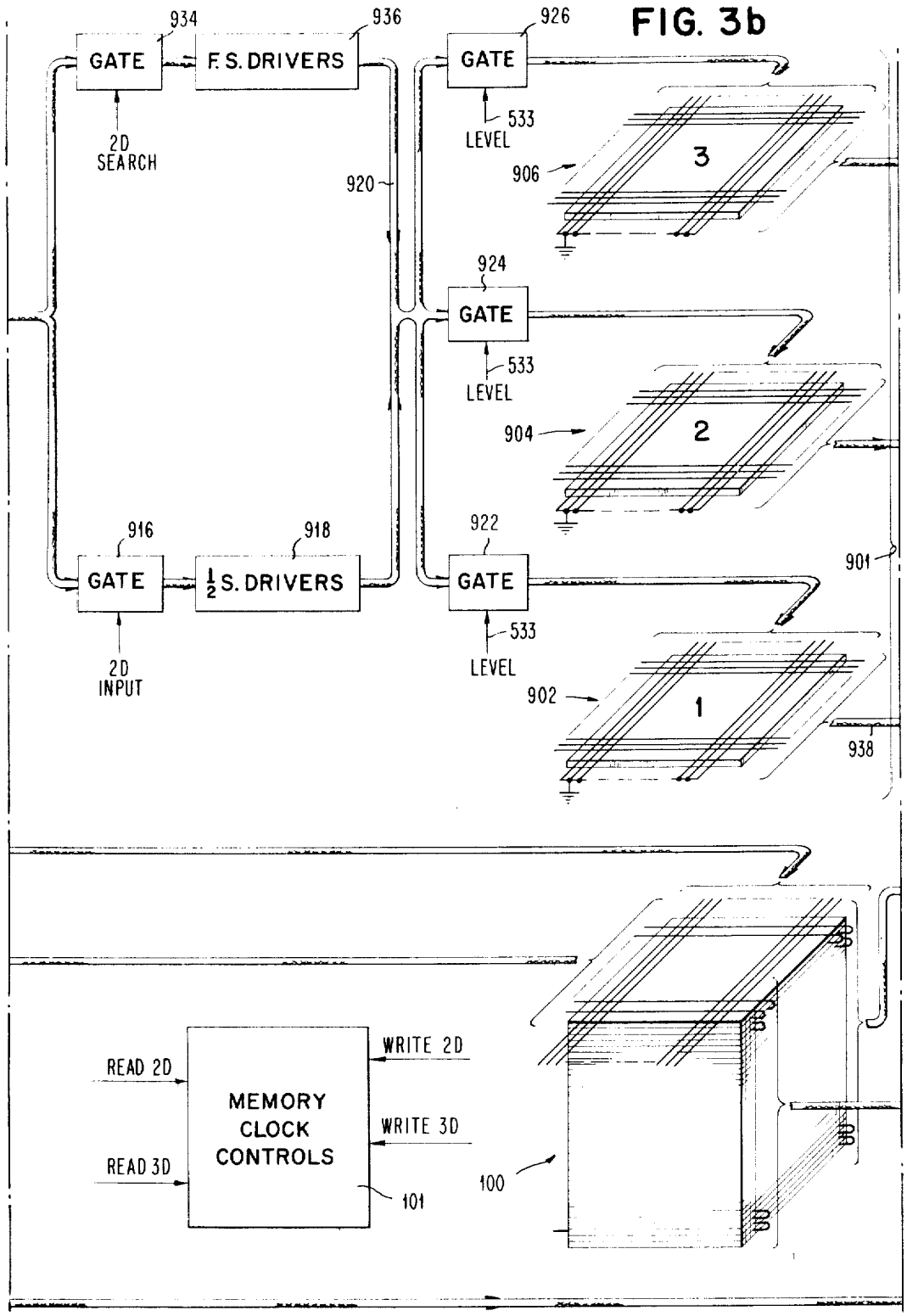

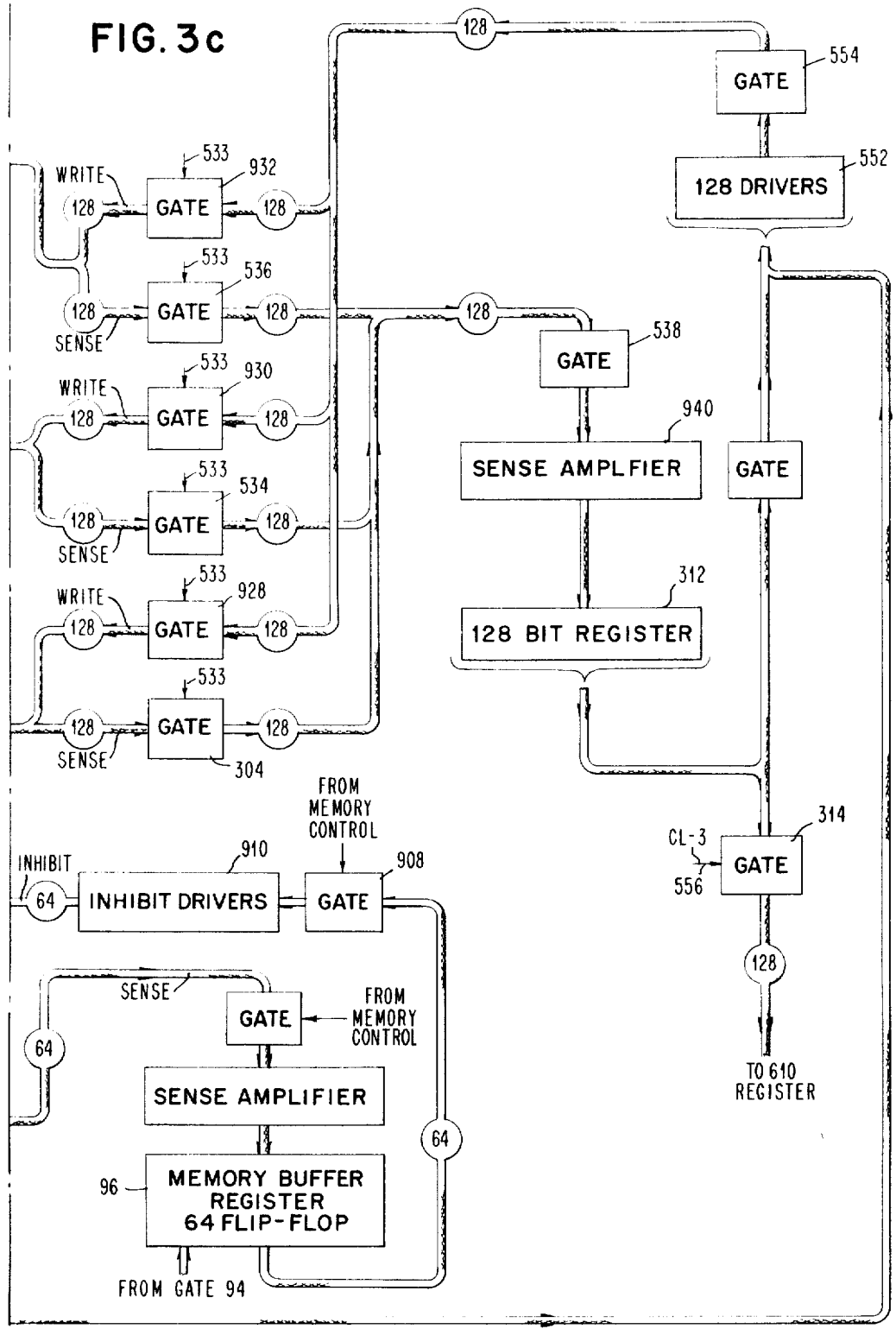

ments of data set off by such level identifiers and thus, level identifier occurrence marks in the auxiliary storage means, the necessity of beginning every search from the beginning of such a string is very inefficient both of the programmer's time and also the machine time.

3,293,615
CURRENT ADDRESSING SYSTEM
Alvin P. Mullery, Chappaqua, and Ralph F. Schauer, Hawthorne, N.Y., assignors to International Business Machines Corporation, New York, N.Y., a corporation of New York
Filed June 3, 1963, Ser. No. 285,443
17 Claims. (Cl. 340—172.5)

The present invention relates to an improved addressing scheme for the sequential addressing of data in the memory portion of an electronic computer. More particularly, it relates to such a system for use with a variable field length hierarchically organized memory system which may utilize the address of a previously located segment of data in a data string as the beginning point for subsequent searches.

The invention has particular utility in a computer data storage and handling system in which the data is of variable field length and is arranged in hierarchical levels which is an organization in which the data has different orders or levels of importance. This hierarchy is denoted by special symbols included in the data and when the data is input into the system, the location of the special symbols is denoted by occurrence marks in a separate auxiliary memory wherein the storage location in the auxiliary memory is directly relatable to the location of the associated data in the main storage unit. The system includes means for addressing such data by giving an initial or beginning address for the entire hierarchically organized variable field length data string and locating a particular portion of data within said string by sequentially searching through the hierarchical level identifier occurrence marks in the auxiliary memory until the given mark is located as specified by a search instruction.

A data handling system for inputing hierarchically organized variable field length data and providing an auxiliary memory having the above mentioned level identifier occurrence marks stored therein as well as the means for searching said auxiliary memory is set forth and described in copending U.S. patent application Serial No. 282,807 of Rex Rice, filed May 23, 1963. For a highly detailed description of the operation of such a system, reference is made to the above copending application. Only such details are included in the present invention as are considered necessary to implement the addressing system of the present invention.

In the search system set forth and described in the above identified application, it is always necessary to begin a search for a particular level or segment of data within a data string from the beginning of said data string, thus, making it necessary to provide the beginning address of the start as well as the total number of occurrence marks which must be counted from this beginning address in subsequent levels before the desired piece of data can be found. As will be apparent from the subsequent description, for each occurrence mark which is detected by the search controls, a comparison must be made with the desired count as input from the search instruction. It will be evident that each such comparison step is time consuming in terms of machine time and in the case of a data string having several thousand specific pieces or segments of data set off by such level identifiers and thus, level identifier occurrence marks in the auxiliary storage means, the necessity of beginning every search from the beginning of such a string is very inefficient both of the programmer's time and also the machine time.

In a conventional fixed field length data organization, where every segment or level of data must conform in length to one machine word or a preselceted number of machine words, subsequent pieces of data may easily be accessed by merely advancing a counter and feeding the output at a desired point to index the memory address register. However, with a variable field length system to which the present invention is directed, it is not known where one piece of data ends or the next begins in terms of a machine address. Therefore, it is manifestly not possible to find subsequent pieces of information from either the beginning point or some known point within the data string by such means as a counter indexing a register.

What has now been discovered is an improved system for keeping track of the address of a last accessed portion or segment of data in a data string and utilizing this address as a starting point for a subsequent search whenever desirable. This is accomplished by providing a "current address" storage location at some fixed point relative to the actual starting address of each given data string in memory. Means are provided for automatically reading the current address for the data string out of this storage location upon instruction and for automatically updating said current address at a storage location in accordance with a search to be made. Thus, in a long string of data stored in memory in the manner indicated above, once a first piece of data is located and the current address of such data is stored in the appropriate current address storage location provided, subsequent portions of data adjacent the first access portion may be reached much more rapidly by beginning the search at this current address rather than the beginning point for the entire data string.

It is accordingly a primary object of the present invention to provide a memory organization and search system in an electronic computer which is capable of utilizing the current address of a last located segment of information in a data string as the starting point for a subsequent search in said string.

It is a further object to provide a memory storage location adjacent each data string for storing the current address of data found within said string.

It is another object to provide such a system which has particular utility with a hierarchically organized variable field length data organization wherein various segments of data are denoted by hierarchical level occurrence marks placed in an auxiliary memory and such data is found by counting down through such occurrence marks in the memory.

It is another object to provide such a system wherein a current address may be set in the current address storage location at any desired point during a search routine.

It is yet another object of the invention to provide such a system wherein a given search may begin either at the beginning of the data string or at the address of a previously located portion of data in the string.

The foregoing and other objects, features and advantages of the invention will be apparent from the following more particular description of preferred embodiments of the invention, as illustrated in the accompanying drawings.

In the drawings:

FIGURE 1 is a functional block diagram of a hierarchically organized variable field length handling system having means for accomplishing the objects of the present invention incorporated therein.

FIGURES 2a–2j provide a detailed logical schematic diagram of the control circuitry, registers, clocking system, etc., necessary to perform the data input, search, and the automatic current addressing scheme as contemplated by the invention.

FIGURE 3 is an organizational diagram of FIGURES 3a–3c.

FIGURES 3a–3c constitute a block diagram indicating the more important segments of a conventional 2–D and 3–D memory as utilized by the present invention, indicating the manner in which the two memories are addressed for both the purposes of reading and writing.

Figure 4:
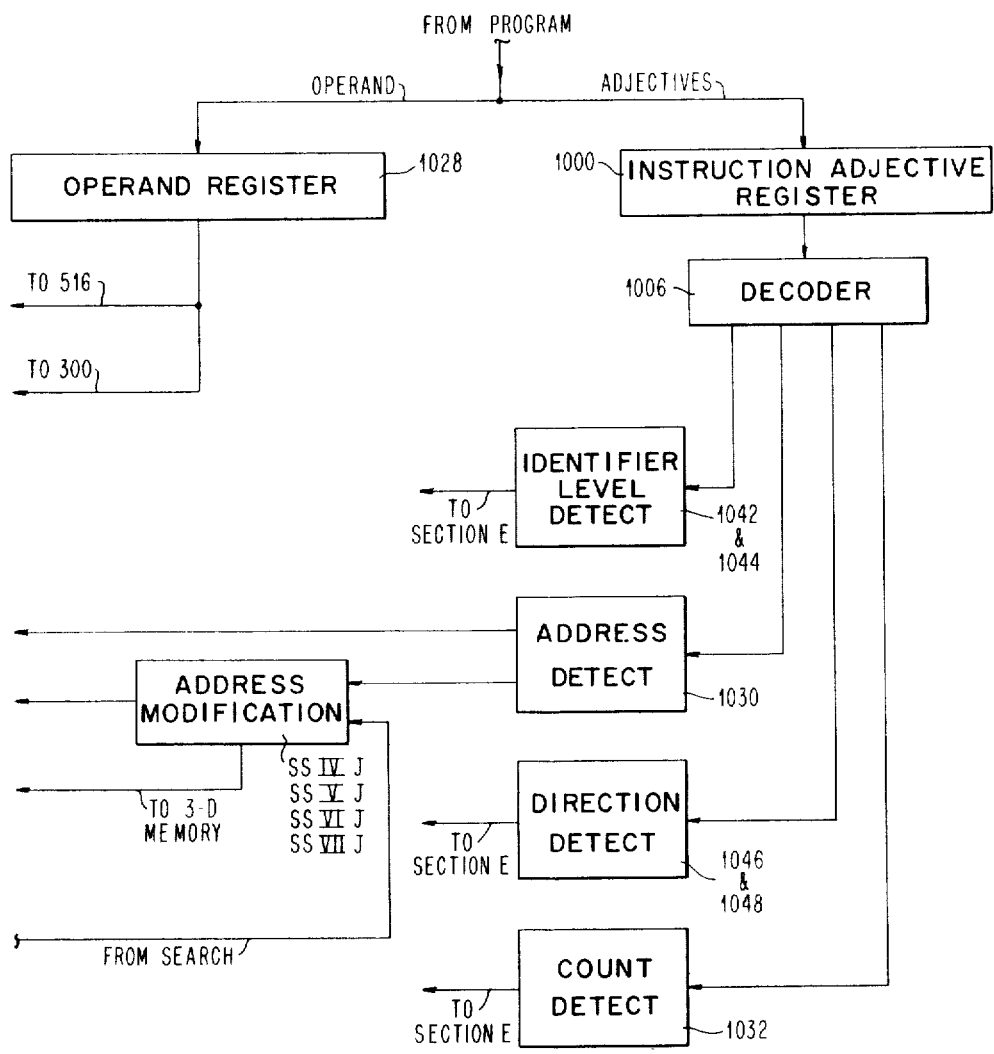

FIGURE 4 is a combination block diagram and flow chart for the search instruction interpretation and control unit of the present invention.

The objects of the present invention are accomplished in general by a data handling and storage system wherein a plurality of strings of data are stored, each string being composed of a plurality of individual segments which are separately addressable in said storage means and each string having a known beginning address. The improvement which comprises providing a storage location for storing a current address at a predetermined point relative to the beginning address of each data string and means for selectively reading out the current address from said storage location and beginning a search sequence from said current address within the string. Means are additionally provided for automatically storing a new current address in accordance with a given search instruction in said storage location.

Before attempting to describe the particular current addressing and search system of the present invention, it is thought necessary to provide some background of a hierarchically organized variable field length data storage system and generally describe a system capable of storing and searching such data.

The use of a variable field length hierarchically organized data format and machine storage system provides the basis for a far more direct and logical machine language which avoids much of the involved programming of present day computers. It combines many of the advantages of both associative memories and random access memories and possesses the additional advantage of being able to automatically store and search variable field length data. As is well known, an associative memory permits the reading out of large sections of a memory in parallel and testing for certain data in certain significant storage locations of the data itself, while a random access memory permits the direct addressing of individual segments of data directly where stored in the memory rather than reading all of the data out serially until the desired portion is found. The use of a current addressing scheme which comprises the subject matter of the present invention further improves such a system in that many sequential search operations may be greatly simplified and automatically carried out with a minimal amount of extra hardware provided in the machine system.

As previously stated, the present invention specifically relates to a search instruction interpretation and control system for use with a hierarchically organized variable field length data system containing hierarchical level identifier symbols and utilizing a special auxiliary memory to keep track of the occurrence of said symbols in the data. While an exemplary embodiment of a memory storage and search system will be disclosed and described to illustrate how such a data storage configuration may be obtained, the input and search control circuitry per se form no part of the invention as they are fully disclosed and claimed in the above identified copending U.S. patent application of Rex Rice.

To facilitate an understanding of the present invention, it is first thought necessary to describe the hierarchically organized language or data format to be used, followed by a general description of the type of search instruction which will be used with the system to facilitate current addressing of data within a data string. Having described generally the language and instruction format, a general description of the over-all system organization with particular reference to FIGURE 1 will be presented. Next, a description of the more significant functional portions of the data input and search system of FIGURES 2a–2h will be given together with a specific example of an input or storage operation of a data string to illustrate the manner in which the hierarchically organized data is stored in the present system. Finally, the specific details of the search instruction interpretation unit which forms the present invention will be specifically described with reference to the logical schematic diagram of FIGURES 2i and 2j as well as FIGURE 4. In connection with this latter description, a specific search example will be given in which a search instruction will be analyzed by the search instruction interpretation control unit and actually searched by the search portion of the device E, F, G and H.

Data format

In general, any group of data consists of strings of symbols. A 3 x 3 matrix, for example, is a string of nine symbols, in this case the symbols are usually numbers. But more than just a string of symbols, a hierarchy or grouping is usually imposed on the string. In this matrix example, the grouping consists of symbols which are contained in rows which are contained in the matrix. This is a simple grouping. As stated previously, English language considered as hierarchical data is grouped as follows: symbols (or words) are in phrases, are in sentences, are in paragraphs, are in chapters, are in books, are in libraries. The symbol is the lowest meaningful grouping, e.g., the character $b$ has no meaning; but the characters "ball" do represent something and, therefore, make up a symbol. The four characters $b$-$a$-$l$-$l$ are a symbol for the actual ball. Another grouping is as follows:

Fields
Records
Groups
Blocks
Tapes
Files
Libraries

The data groupings or levels are often used terminology in the computer art where "fields" would be the lowest or least significant member of the hierarchy. The subsequent names or levels ascend in order to "libraries," which is the highest or most encompassing member of the group. However, no matter what these groupings may be called, they exist within the data and in the data organization to which the present invention is directed and are indicated by special identifier marks. These identifiers appear as special symbols in a data string which indicate the end of one group and the start of a new group. Many different such marks may be used, depending upon the names which have been given to the grouping. In order to avoid unnecessary confusion, the following groups of hierarchical levels will be used throughout the remainder of the specification, it being understood that these names have no other significance per se than to give convenient names to the various hierarchical levels.

Identification mark: Group name character
- ① ─────────────── Symbol.
- ② ─────────────── Phrase.
- ③ ─────────────── Sentence.
- ④ ─────────────── Paragraph.
- ⑤ ─────────────── Chapter.
- ⑥ ─────────────── Book.
- ⑦ ─────────────── Library.

As stated previously, when the structure of a string of data or instructions is to be identified, these identifiers are used and incorporated directly in the data string. The ① identifier will indicate the end of a symbol and the start of a new symbol. These identifiers form a hierarchy in that a ② also implies a ①, a ③ implies a ②, and a ①, etc. If more than one identifier ever appears together with no other characters separating them, all but the highest identifier will be neglected and dropped.

With this type of data format using the apparatus to be set forth more fully subsequently, the occurrence of the various levels or identifier marks, i.e., ①, ②, ③, etc., in a string of data to be stored in the memory are marked in special "identifier" planes in the memory. Each available machine word in the main memory has a storage cell available in each of these planes wherein the occurrence of that particular level of data in the machine word may be marked by a binary "1," as is well known.

Each string of data symbols can be given a name which, for the purposes of this invention, might be considered the highest level word in the data string. This name may be comprised of any combination of any number of characters, such as the words, alpha, beta or gamma indicated as being of a certain level and subsequent levels of the string are purely numeric. The only restriction on such a name is that a particular combination of characters have no more than one meaning. These names are stored in a name table together with their addresses in one system utilizing the present data storage system and the use of the name by the programmer will automatically provide the beginning address for the latter string. It is, of course, obvious to one skilled in the art that other systems could equally well be used to determine the beginning address of a string including the absolute address per se.

An example of a typical machine instruction as anticipated by the present invention could be as follows:

$$A①↑7 + (B③↑5②↑2①↑6 \times C①↑1) \longrightarrow D①↑1$$

wherein the arrows simply means the number following describes the level identifier preceding the arrow thus, ① ↑ 7 means the seventh ① in the data string whose name and address is A. A, B, C and D are names of data strings and as stated above, may be easily related to an address. Thus, the above instruction is all that is required of the programmer to perform the indicated mathematical computation using the data storage and search system of the present invention.

In order to illustrate instructional programming, the following comparison with typical devices is made.

This instruction will replace at the minimum the following I.B.M. 704 machine instruction:

```
 05600004736  (B→MQ)
 02000004737  (MQ×C→Acc, MQ)
 04000004735  (Acc+A→Acc)
 06010004740  (Acc→D₁)
−06000004741  (MQ→D₂)
``` where:
- 4735 is the location of A
- 4736 is the location of B
- 4737 is the location of C
- 4740 is the location of the first thirty-six bits of D and:
- 4741 is the location of the last thirty-six bits of D.

It will be readily apparent that if A, B or C were data strings of more than the allowed number of bits in one 704 machine word, a much more extensive series of instructions would be required.

The significance of the above comparison of a typical I.B.M. 704 computer instruction program with that of the instant system is that the absolute addresses of A, B, C and D are completely machine generated in that the data is automatically searched and located by merely naming same in the instruction. The machine obviously must do more work; but, the simplification of the programming is very obvious. Thus, the present system is a departure from prior art systems where the function of the hardware depends on very rigid rules for data format, length and even content.

It is, of course, to be understood that for the present invention to be operative, to be able to break up and store incoming data into the hierarchically organized memory system as described above, said data must have been broken up or grouped in accordance with the desires of a particular operator previously. That is, the particular level identifier marks which are to be used, namely the ①–⑦ set forth above with the symbol through book type of a designation must have been previously accomplished in accumulating or assembling the data whether it be on punched cards, paper or magnetic tape. When such data is placed on the permanent storage element such as the cards, or tapes, it may be entered manually; for example, it may be punched in binary form by a key punch operator or the like. In such a manual system, the identifier marks are merely inserted in the data string between words as indicated previously with a conventional eight bit binary designation. The following list of eight bit characters is merely intended to be exemplary of a code used in an embodiment of the present invention, it being understood that any convenient code which is compatible with the over-all data handling system being used could likewise be utilized in the machine. Of course, the compare circuit which will be more fully described later would have to be revised to produce a signal upon recognition of the particular level identifiers being used.

- ① ─────────────── 10100001
- ② ─────────────── 10100010
- ③ ─────────────── 10100011
- ④ ─────────────── 10100100
- ⑤ ─────────────── 10100101
- ⑥ ─────────────── 10100110
- ⑦ ─────────────── 10100111

Thus, in an incoming string of data, these particular level identifier bits will be placed at appropriate locations in the string of eight bit characters being put into machine storage.

It should perhaps be noted that the reason an eight bit code is used is that the level identifiers will be mixed in with all data being input and in a flexible over-all system in excess of two hundred recognizable characters including the alpha-numeric characters, special symbols and the level identifiers, symbols will be used. Accordingly, an eight binary bit code is necessary.

In describing a preferred embodiment of the present invention, several limitations will be placed upon the format of the data placed in storage to facilitate a concise description. However, it is to be understood that the invention is not intended to be limited hereby. Referring to Table I which follows, a typical data string consisting of a personnel record of an employee is to be placed in the main memory. The data string is as follows:

④ 080964 ③ J O E ＄G L O PMEYER ③ 1956 WEST 4th STREET ① POUGHKEEPSIE, N. Y. ④.

The manner in which this data string would be stored in main memory according to the teachings of the present inveniton is illustrated in Table I.

TABLE I

| | | | | | | | | | | |
|---|---|---|---|---|---|---|---|---|---|---|
| ⑦ | | | | | | | | | | |
| ⑥ | | | | | | | | | | |
| ⑤ | | | | | | | | | | |
| ④ | * | | | | | | | | | |
| ③ | * | | | | | | | | | |
| ② | * | * | | | | | | | * | |
| ① | * | * | * | | * | | | | * | |

Special Core Planes (2-D Memory)

| ④ | ② | P | ① | T | E | ① | | E | Y | ② |
|---|---|---|---|---|---|---|---|---|---|---|
| O | I | M | 1 | 4 | T | P | | P | – | |
| 3 | O | E | 9 | T | N | O | | S | N | – |
| O | E | Y | 5 | H | N | U | | I | N | – |
| 9 | S p | E | 6 | S | N | G | | E | N | – |
| 6 | G | R | W | T | N | H | , | | N | – |
| 4 | L | N | E | R | N | K | | N | N | – |
| N | O | N | S | E | N | E | | | N | – |

Main Memory

The upper portion of the table indicated by the bracket and marked Special Core Planes 2-D Memory shows to the extreme right ①–⑦ wherein each of its circles indicate a special core plane. The lower section enclosed with the bracket and entitled Main Memory represents a data string stored in binary form through main memory actually, as will be well understood by a person skilled in the art, each of the alphabetical representation would be placed in a binary code. As may be seen from this lower portion of the figure, each vertical column represents a machine word of eight characters. Thus, a machine word having sixty-four bit storage positions would be necessary for eight, 8-bit per character machine words. It will be noted that the identifier marks ①–⑦ always occur at first position or first character position in any machine word and never are located down through the word. It will further be noted that where one portion of the data string between two identifier marks was less than eight characters, a null character indicated by $N$ has been inserted in that position of memory to indicate a null and that the search procedure or read out is to proceed automatically through to the next position having information other than a null stored therein. It will further be noted that when more than eight characters appear between two level identifier marks, the first position of a machine word may not necessarily be an identifier mark, as in the case of the third column where P, which is a continuation of the employee's last name from the previous column, has been carried over into the first position of this machine word. As in the previous case where the end of the employee's name does not completely fill a machine word before the next word level identifier occurs, two null characters are automatically inserted to fill out the remainder of this machine word.

Referring again to the upper portion of Table I, in the 2–D Memory it will be noted that the asterisk indicates that a binary "1" or an occurrence mark has been placed in the special core planes at an address location corresponding to a machine word in main memory which contains such special level or identifier mark. It will further be noted that where a ④ or ② occurs, all of the subsequent level marks, i.e., ⑧ ② ① and ①, respectively, are placed in the special core planes again corresponding to the particular machine word in which the upper or dominant level indicator occurred.

*General description of the search instruction*

Having thus described the structure of an input data string of the hierarchically organized variable field length type and also the manner in which it is to be stored in memory, a description will now follow of the particular type of search instruction in accordance with the present invention. This description will include a definition of the terms used for the various portions of the search instruction, and further specify the manner in which such instruction is input to the machine system.

As stated above with the data storage system and search procedure utilizing an auxiliary storage means for placing or storing occurrence marks of all of the hierarchical level identifier symbols therein when such symbol appears in a machine word in main memory, a search of this auxiliary memory will yield the absolute addresses of the various hierarchical portions of said data upon location of a desired mark in said auxiliary memory. The above identified copending U.S. patent application of Rex Rice sets forth a search system for such a data organization wherein a search for a given bit or portion of information in the data string is begun at the beginning address of said data string and the beginning of the desired portion or segment of data found by counting occurrence marks in the auxiliary memory starting at this beginning address. In the previous example of a typical machine instruction utilizing such a data organization, very simple addresses were provided for various bits of information, for example, one piece of data was indicated as A ①↑⑦. In this search instruction, the A represented a machine address which was the beginning of the data string containing the particular desired portion of the data; ① represented the level of the auxiliary memory in which a search was to take place and the 7 denoted the number of ① occurrence marks or marks in the particular portion of the auxiliary memory containing such level marks which must be counted before the desired portion of data has been reached. It should first be noted that such search instructions are normally considerably more involved, in that they require a number of search steps in sequences before the desired piece or segment of data is found. For example, such an instruction as: A ④↑7, ③↑2, ②↑5, ①↑3 might be a typical machine instruction wherein a search was to proceed down through four hierarchical levels of data in the auxiliary memory before the desired piece of data is found. In the terminology to be used subsequently in describing the invention, the letter A or address, constitutes the operand and the combination of each circle or identifier character plus an address indicator, i.e., the vertical arrow in the above example plus the number, denote a search adjective. In most instances, a search will comprise an operand and one or more adjectives. The simple arrow appearing in an adjective indicates that the search for the particular level identifier will begin at the beginning address of the data string if it is the first adjective and means that it will begin at the address of the previous adjective if this search indicator is not in the first adjective position.

What is anticipated by the present invention is that two additional search indicators be provided, i.e., a "current address" indicator denoted by the symbol ¢ and a "set address" indicator denoted by the symbol $. What these symbols mean is that when the "current address" indicator is encountered in a search adjective, the search for the level indicator of that particular adjective shall begin from the current address for the data string. This address will be obtained from a special storage location provided therefor in the main memory for each data string and said indicator further provides that the address found in accordance with this adjective, or search instruction starting with the previous current address will be automatically stored in the special current address storage location automatically upon completion of the search prescribed by said adjective.

The search "set address" ($) denotes that when this symbol is encountered in a search adjective, that the search is to begin at the beginning address of the data string or conversely at the last obtained address from previous adjective in a search instruction but that when the address for that particular adjective is located that address will be stored in the special current address storage location provided in the system.

It may be seen from the above description that the first adjective for a given search instruction would normally contain either the simple address indicator which indicates a search is to begin at the beginning address of a data string or a current address indicator which indicates that a given search is to begin at the current address point. The set address instruction ($) may be used anywhere in a particular search instruction, i.e., any adjective position where it is desired to set a current address point for a subsequent search. Thus, in the above example, if it were desired to begin a search in a data string beginning at address A, but beginning at the address of the most recently located piece of information in said data string, the current address indicator (¢) would be indicated after the ①. Since the current address indicator also requires the setting of the new current address for this particular adjective in the special current address storage location that is the current address that will be set for this data string unless a set current indicator is used somewhere later. For example, if it is known that the second hierarchial level, i.e., ②, is a convenient place to mark the current address, the subsequent searches can be easily related to the current address at this level point. A set address indicator ($) would be utilized in the address adjective for the ② level to cause the current address for this adjective to be stored.

Using the above outline search instruction language a very versatile type of search programming may be easily accomplished. A search in a given data string may selectively begin at the beginning of the string or at a current address located somewhere down in the string upon the option of the programmer. Similarly, the programmer. Similarly, the programmer at his option may provide new current addresses for given data strings particular level or point in the search instruction by providing the proper address indicator with the adjective for that particular level.

As described previously, a special storage location must be provided for the storage of the current address for each data string. In the presently disclosed embodiment of the invention the special storage location is provided at the beginning of the data string and is assumed to be located at the data string address. However, it should be understood that it would be possible to provide this storage location at any fixed position in a data string relative to the data string beginning address so long as the special storage location were automatically accessible to the search control circuitry for the reading out of the current address based solely on the data string address. The importance of this aspect will also be apparent in the description of an alternative embodiment of the invention wherein it is possible to provide more than one current address for a given data string. It should further be noted that such a special storage location would be provided in the input data string by means of a special character which would take up eight characters or one machine word. Once this storage location is established in the data string any information i.e., the current address may be written into any desired portion thereof. Further, since no level identifier will appear in the special current address of storage location, no level identifier occurrence mark appears at the associated location in the special core planes of the associated auxiliary memory; therefore, a search of a data string may begin at the special storage location without introducing any errors or special conditions in the search instructions as will be understood.

It should be noted that character positions five and six of the eight character machine word utilized in the disclosed embodiment of the present invention are the character positions specifically used for storing the current address as is well known, only fourteen bits positions are needed to store a given binary X–Y address in a 128 x 128 3–D memory so that there are actually two extra bit positions in the allocated character storage position of the current address storage location. These last two bit storage positions are simply ignored in reading or writing a current address into memory.

Thus, in summary, a search instruction as anticipated by the present invention will include an operand, i.e., an address, and a series of adjectives or level count instructions each of which will include a level identifier indicating the level of the auxiliary memory in which the particular stage of the search is to be made, an address indicator mark, i.e., ¢ or $, and a direction indicator whether the search is to proceed to the left or to the right starting at the address indicated in the adjective and finally, the count or number of occurrence marks which must be accessed before a successful detection has been accomplished.

In the particular machine language anticipated by the present embodiment, such a search instruction is comprised of a series of eight bit characters, the first two of any search instruction of course, containing the operand which is automatically gated to the operand register as will be described subsequently.

The adjective portions of the search instruction comprise one or more five character groupings. Each five character grouping is arranged as follows: The first character specifies that identifier symbol or level to be seached. The second character indicates the particular address indicator or addressing mode to be used, i.e., ¢ or $. The third character is a direction indicator and is designated in the subsequent explanation as a plus (+) or a minus (−), a plus (+) meaning a search is to proceed to the right and a minus (−) meaning a search is to proceed to the left. The fourth and fifth character positions of the adjectives are the count digits, i.e., the first being a tens digit and the second being a units digit, thus, any number up to ninety-nine counts could be handled by the particular embodiment disclosed herein. It is, of course, to be understood that any number of digits could be handled by providing an additional character in the machine word and in the decode circuitry necessary to accomplish an evaluation of the search adjective.

Having thus described the form of the data and the data structure utilized in the present invention as well as the form of search instruction which is to be evaluated by the circuitry which constitutes the essence of the present invention, the apparatus necessary to effect the aforementioned objects of the present invention will now be described.

Referring now specifically to FIGURE 1 which is a block diagram of a computer memory system incorporating the principles of the present invention. The system includes means for automatically inputing hierarchically organized variable field length data having hierarchical level identifier symbols included therein as outlined above. Said input means including means for automatically breaking up the data into the separate hierarchical levels indicated by included symbols and storing same in the 3–D memory and simultaneously storing the necessary occurrence marks in the various portions of the 2–D auxiliary memory. Means are also included for evaluating a search instruction of the type set forth above and accomplishing a search for data within said memory structure in accordance with the search instruction. The over-all system of FIGURE 1 will now be described block by block.

Section A entitled, "Input Buffer," serves the function of taking data from a relatively low speed input system, storing it temporarily, and outputing it into the machine at a higher speed at which the machine is capable of operating. It functions as a temporary buffer storage and allows the actual machine circuitry to operate at optimum efficiency. The data flows from this input buffer into what may be generically referred to as an "Input Compare and Control Section," designated B. The input data is taken from the Input Buffer A a character at a time and brought into the compare and control circuitry.

Section B functions to examine each character and determine whether or not it is one of the chosen level indicator marks, i.e., ①–⑦ and if so, to break up the data string in accordance with the rules set forth above. Referring to Table I. for example, this block automatically (1) places the level identifier marks in the number one position of a machine word, (2) provides for insertion of occurrence marks in the suitable special 2–D core planes, (3) keeps count of the characters in a machine word so that the memory buffer register will read each series of eight characters out as they occur into main memory, (4) will read a word out of the memory buffer register into main memory when a second level identifier occurs before a total of eight characters are placed in the memory buffer register and further operates in conjunction with the memory buffer register resetting mechanism to automatically insert null characters in the proper positions of the memory buffer register for subsequent read out and storage.

The Input Clock Section C functions to control the sequential operation of the input compare and control circuitry of Section B.

As stated previously, data is fed from Section B directly to the memory buffer register which gates such information into main memory in accordance with the Input Clock C. The level marks are similarly placed in the proper positions in the 2–D memory from the counting register of the input compare circuitry which will be explained in more detail subsequently.

The Main Memory Section D comprises the 2–D memory and also the 3–D memory together with the various registers and automatic clocking mechanisms which are quite conventional in their organization and operation. The operation of such memories is very well known in the art and a detailed description of all facets of such operation will not be attempted. (A specific description of the operation of the 3–D memory section keyed to the timing chart of FIGURE 6 is included as a general background of such operation.) The description of FIGURE 3 will make it apparent how the addresses for the 2–D and 3–D memory are derived in general logical block form and it is believed that this description will quite adequately describe the operation of the actual memories.

The memory disclosed and described in this embodiment of the invention is a magnetic core storage type of memory; however it is to be understood that other types of two and three dimensional memories could equally well be used in practicing the present invention. For purposes of subsequent description, it will be assumed that the 3–D portion of memory is 128 x 128 bits in the X and Y directions and is sixty-four bits deep, thus allowing eight bit characters and eight character words as described previously. The special core planes as set forth in the present embodiment are likewise 128 x 128 in the X–Y direction, thus having a possible binary bit position for each machine word in the associated main memory. In the embodiment of the invention disclosed in the drawing of FIGURE 3 in the specification, the special core planes are shown located directly above the 3–D portion of the memory and it is believed that this would be the most convenient type of an arrangement for making such a memory; however, it is to be understood that the special core planes could be remotely from main memory, the only requirement being that addresses determined for one have a one to one correspondence for addresses determined for the other.

Sections A, B, C and D comprise that portion of the system necessary to input data into the main memory in accordance with the general hierarchical pattern as illustrated in Table I. This input is done completely automatically without necessitating any control on the part of the machine operator.

Sections D, E, F, G and H comprise the search portion of the instant invention and include circuitry for automatically searching the hierarchical memory organization which has been achieved by the input section.

As will be well understood by a person skilled in the art, much of the circuitry of Section D which comprises the main memory, address registers, drive rings, decoders, etc., will be common to both the input and the search procedures. The following specific descriptions of FIGURE 3 and also of the search and input examples keyed into the composite diagram of FIGURES 2a–2j will clearly indicate which major functional portions of the Memory Section D are utilized for both input and search procedures.

Section E comprises a plurality of registers and flip-flops which received information from the Instruction Interpretation Unit I which indicates what is to be searched for in main memory. As will be described more fully subsequently, this search for data begins with a starting address or operand and includes one or more adjectives which indicate which of the level marks starting at this address are to be located in the main memory. The information from Section E is read a step at a time to the "Level Search Ring" Section F.

Section F comprises a search ring and appropriate controls necessary for gating information or data from one of the special 2–D core planes at a time. The circuitry of this Section goes through the information stored in the special core planes and counts until a particular bit in this core plane is found. When a given bit is found, it is either placed in the special "Storage Registers" of Section H or the next step in the search sequence as requested from Section E depending upon the search instruction.

The functions of Sections E, F and H are controlled again by a clock indicated by Section G and entitled, "The Search Clock." This clock is quite similar to the "Input Clock," Section C, and controls and synchronizes the various operations of the search procedure to accomplish a routine and orderly search of the data to find the desired address of the data in storage as stipulated by the search program.

Block I labelled, "Instruction Interpretation Unit," comprises the registers and circuitry necessary to interpret the previously described search instructions as they are used in the present system. The circuitry includes the necessary registers, transfer means, comparison circuits and other logical circuitry for receiving the beginning address of the data string in which a search is to be made or operand as it is referred to above and sequentially reading from storage the search program steps up into their sequential segments and performing the required search operations until a particular search instruction is completed. The compare circuitry further determines from each adjective in what hierarchical level a search is to occur, interprets the verb address indicator portion of the adjective to determine at which address a particular search sequence is to begin, determines the direction of the search and finally, the number of counts within a given level which must be detected before a successful comparison can be made by the compare circuitry. The unit further includes control means for up-dating the current address storage location of the main memory upon instruction to do so by the search instruction.

Block J comprises a series of single shot multivibrators which make up the instruction unit clock and its organization and operation are quite similar to the Input Clock Section C and the Search Clock Section D previously described.

Having thus generally described the over-all system as disclosed in FIGURE 1, a specific description will follow of the Input Section and an example of the data input will be given wherein the auxiliary memory is loaded with the occurrence marks as described above. Subsequently, a general description of the Search and Instruction Interpretation Units will be set forth with general reference to FIGURE 2 and finally, a specific example of an instruction interpretation based on an input or search program together with the specific details of the searching sequence in accordance with this instruction will be set forth. This latter example will provide a specific description of most of the logical circuit elements set forth. This latter example will provide a specific description of most of the logical circuit elements set forth in FIGURE 2, those whose function is not specifically recited will be apparent from its use and location in circuitry.

Having described FIGURE 1, it will be seen that the present system may be logically broken down into three major portions, namely, the Input portion, the Search portion, and the Search Instruction Interpretation portion.

Referring now to FIGURES 2a–2i, a general description of this logical schematic diagram of the necessary control circuitry registers and so forth, will follow. When referring to the composite logical schematic of FIGS. 2a–2h references will simply be made to FIGURE 2 subsequently in the specification.

Figure 2F:
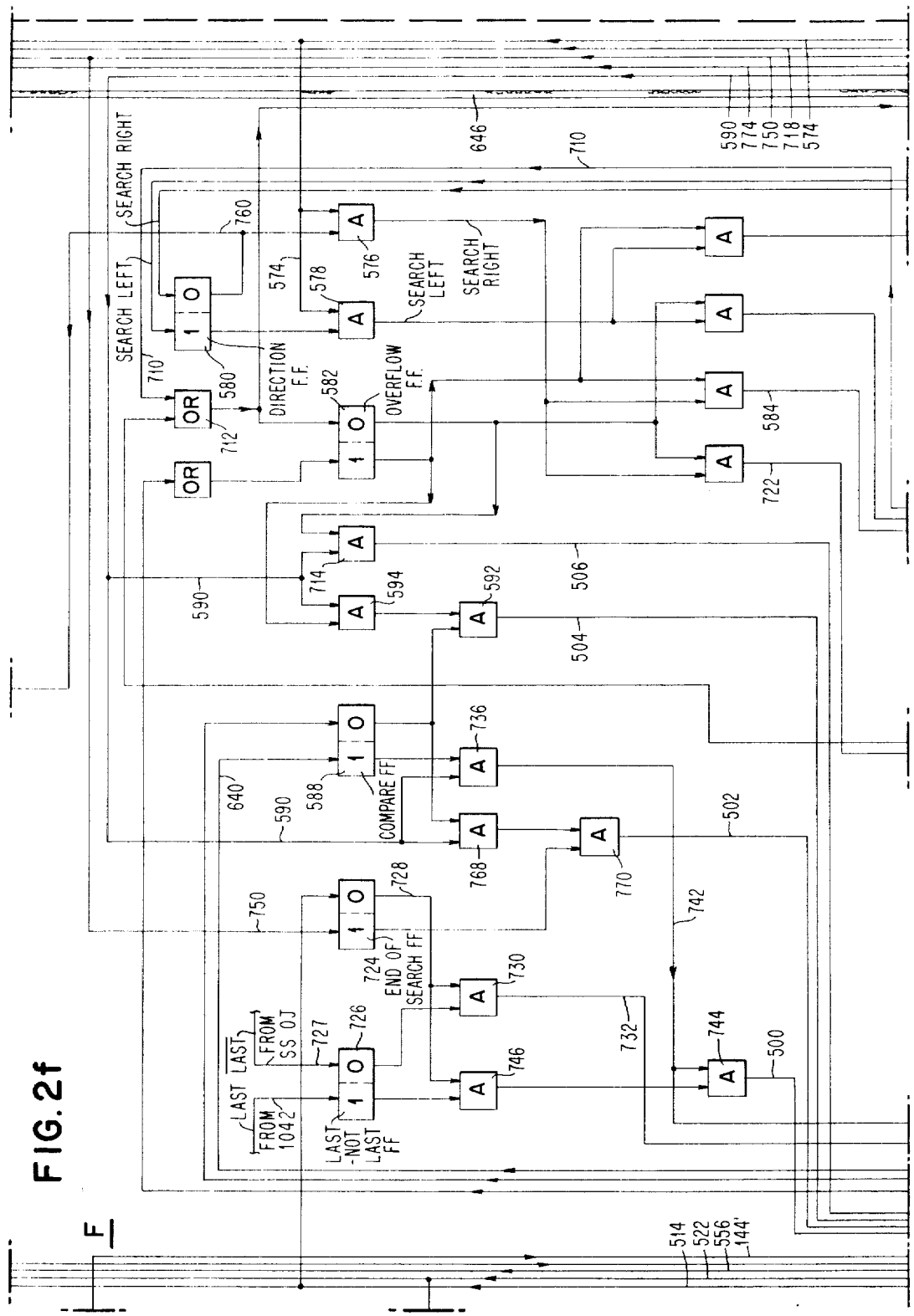
FIGURE 2 is an organizational diagram of FIGURES 2a–2j.
Figure 2H:
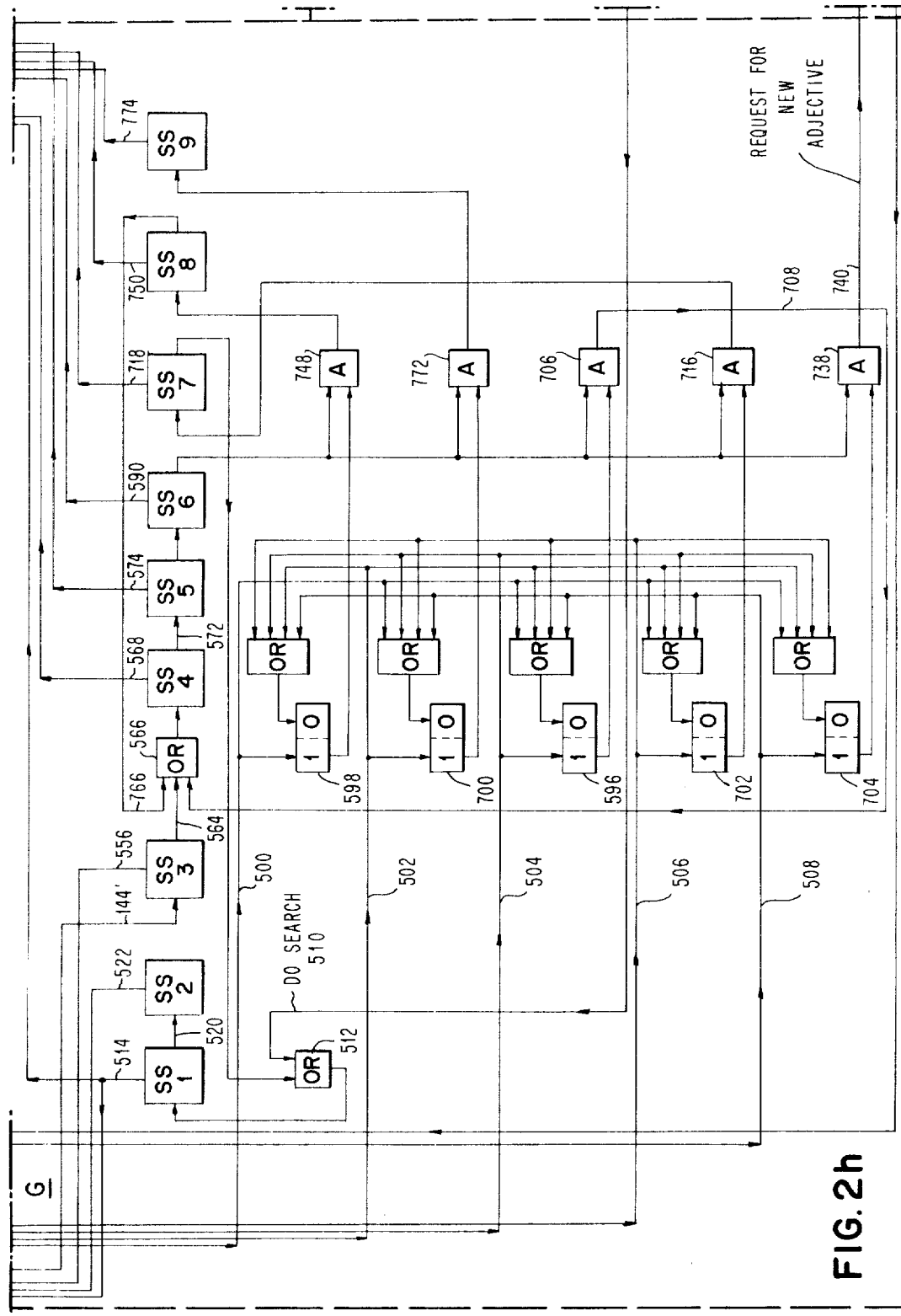
Figure 2I:
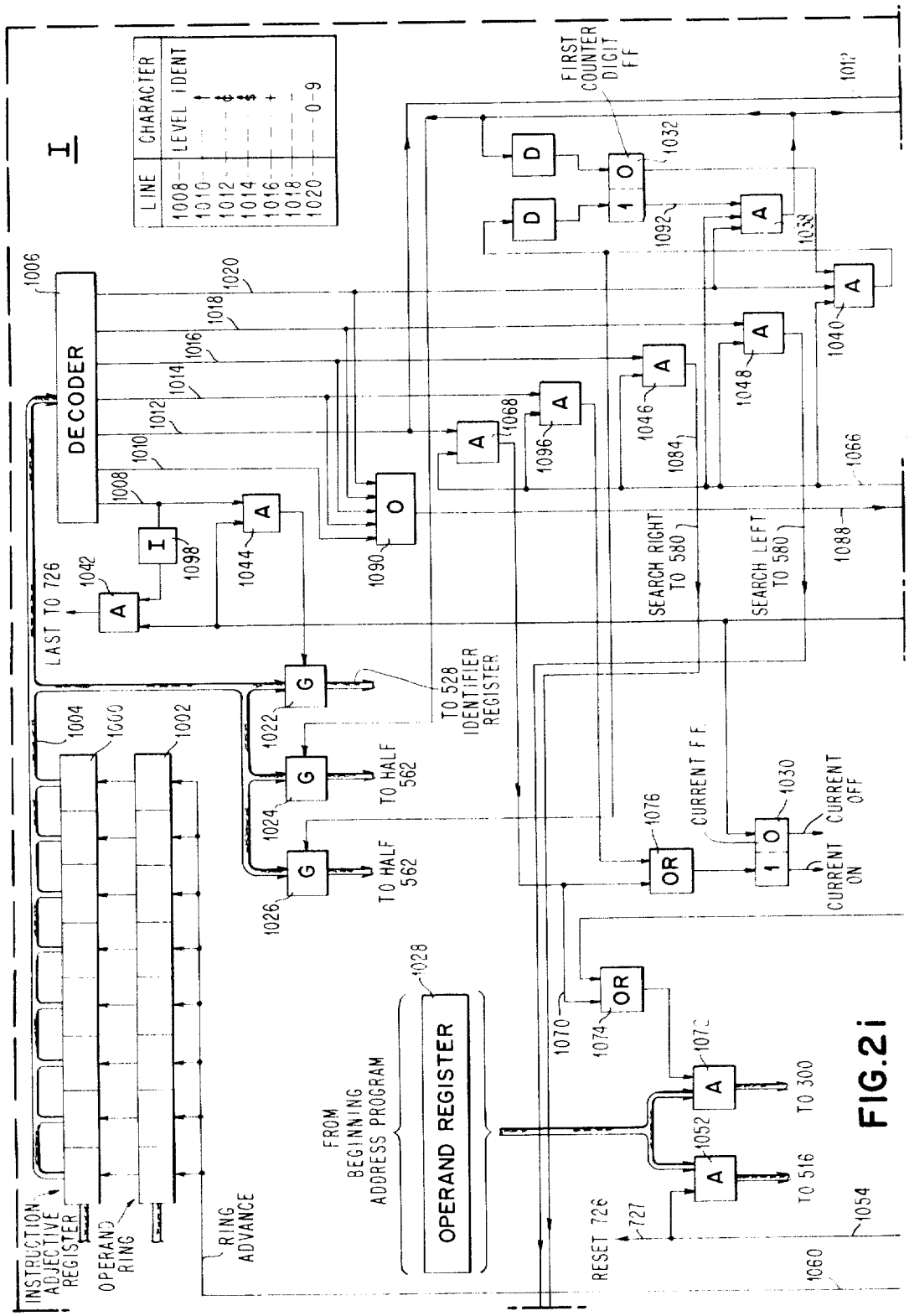

FIGURE 2 itself is an organizational diagram of the individual components of FIGURES 2a–2h making up this over-all diagram. As stated previously, its circuit is shown in logical schematic form, all of the individual blocks shown being conventional circuits well known in the computer art. It is the specific organization and interconnection of the circuits which constitute the present invention.

It will be noticed in this drawing that FIGURE 2 is broken up by dotted lines into major Sections A–J which correspond to the Sections A–J of the over-all block diagram of FIGURE 1.

Referring now to Section A of FIGURE 2, the input buffer Storage Section 10 comprises a plurality of latches such as shown in "Arithmetic Operations in Digital Computers," by R. K. Richards, D. Van Nostrand, Inc., New York, FIGURE 2–14a. It will be seen that there are twelve stages or blocks in this input buffer register which means that up to twelve characters can be stored therein at any one time. It should be noted that although twelve has been found to be a convenient number to give satisfactory flexibility to the system that any number of stages desired could be used depending on the particular input medium, such as paper tape or magnetic tape, which is employed as the data input source. The Input Buffer 10 is controlled by the Input Control Ring 12 and the Input Control Ring 11 which determines the particular stage of the Buffer 10 into which information is being stored and from which information is being taken, respectively.

Information is allowed to be entered into the Input Buffer Stages 10 under control of the input medium which, as stated previously, may be a magnetic or paper tape, magnetic drum, etc. As each character is available on the input bus, an input advance pulse also supplied with the input data as a marker pulse or the like will cause the input control ring to be stepped to the next position so that the charatcers are gated into successive positions of the Register 10. The input and output control rings are conventional stepping rings such as shown in the before referenced Richard's textbook, FIGURES 7–13(a). As stated above, the actual number of positions of the buffer register of the Input Buffer Register 10 may be changed, the only requirement being that it be large enough to hold enough information so that one memory word can be loaded into the memory buffer register without having to wait for the input to catch up and also, that there be a continuously available blank input position so that the input is not held up by the output speed. As a practical matter, the output from the Input Buffer Register 10 is so much faster than conventional mechanical input systems that this latter restriction is never a problem.

Counter 14 is provided to prevent an output from the Register 10 until at least eight characters are stored in the input buffer. This figure is chosen since the memory buffer register and the main memory itself is set up to receive eight characters for a machine word and the efficiency of the system chronologically is greatly enhanced if it is insured that at least a machine word is available in the input register before the comparing, outputing and subsequent storing operations are begun. If a five position memory buffer register and machine word organization were used, a counter producing an output at a count of five would be used at fourteen. It will be apparent again that using such a counter is not absolutely necessary nor is the provision of any particular count level before an output operation will be initiated. The Counter 14 is again a conventional counting register such as disclosed in the before referenced Richards' textbook FIGURES 7–1.

While describing the Input Buffer Register 10, attention is directed to FIGURE 4 which is a more detailed logical schematic diagram of a single stage of the input buffer register. While a more complete description of this and various other types of registers is referred to above, the following explanation briefly describes the operation of such a register stage.

The register stage comprises eight Flip-Flop Circuits 10a, eight being required because an eight bit binary code is used. Incoming data enters the stage on the eight Conductor Input Line 10b. Assuming that this stage is now active, a pulse is produced by the input control ring on the cable provided therefor which activates the Gate Circuits 10c and allows the input data to set flip-flops to the "1" position in accordance with the particular input signal on the lines. As will be noted, an eight conductor input cable is utilized, thus, a signal will appear on only those cables where a "1" forms a portion of the binary code; for such cables as are inactive, on which no signal appears, those flip-flops will remain reset in their "0" positions. It will be noted that a reset pulse is provided for the stage of the registers and sets Gate Circuits 10d together with an output from the Output Control Ring 11 from a previous cycle. Assuming now that input data is stored in the Flip-Flops 10a and their signal is received from the output control ring to output such data into the compare circuitry the Gate Circuits 10e will be actuated by such signal and an output will appear on line 50. As will be noted, a sixteen conductor cable is utilized in the output so that for each bit position, the one or zero cable will be brought up. It will be apparent to one skilled in the art that an eight conductor output cable could also be used wherein only active ones would have a signal; however, this particular sixteen conductor cable is compatible with the particular block diagram compare circuitry shown in FIGURE 5 and is intended only to illustrate an operative embodiment of the invention.

Returning to FIGURE 2, Section B thereof comprises the level comparison and control circuits which are responsible for examining the input data from the Input Buffer Register 10 in accordance with the data organization rules of the present invention set forth previously. Actually, this Section operates or functions in conjunction with Section C which is indicated as the "Input Clock" to (a) Examine each character to determine whether or not it is a level identifier, (b) Initiate a memory cycle when eight characters are stored in the Buffer Register 96, (c) Detect a second level identifier and prevent storage thereof in the memory buffer register in any but the proper position, (d) Detect the end of a data sequence and (e) Provide for the insertion or placing of the proper level identifier marks in the special core planes of the auxiliary 2–D memory.

As stated previously, the operation of the specific circuitry disclosed in FIGURE 2 will best be understood in detail from the specific description of an operating example for both input and storage set forth subsequently in the specification, together with the timing table provided therewith. The examples provided have been selected to set forth a representative illustration of every significant data input situation which would normally occur in an input data string. A similar selected illustration has been employed for the search example.

One of the more significant functional elements of Sections C and D of FIGURE 2 is the level compare circuitry in which each incoming character is compared with the seven level identifiers in parallel. The compare Flip-Flop 64 is to prevent the gating of more than one level identifier in any one machine word and its operation will, of course, be described in detail in the subsequent example. The Compare Counter 62 operates in conjunction with the compare flip-flop to determine the number of level identifiers which have been encountered in a data string insofar as it will affect the storage of such identifier in the memory buffer register and also its position in the machine word.

All of the AND gates, OR gates inverters and flip-flops disclosed in block form in the figures are believed to be so well known in the art, that they do not require specific references. It being generally stated that any of a very large number of textbooks may be referred to for a specific implementation of such circuits. One such book is "Arithmetic Operations in Digital Computers," by R. K. Richards, D. Van Nostrand Co., Inc., New York.

The Memory Buffer Register 96 is again a conventional magnetic memory buffer register. The position of the register into which succeeding binary characters will be placed is controlled by the Control Ring 102 which is also conventional with such registers. Input data is gated into the memory buffer register from Register 6 under control of the compare circuitry.

When a successful compare is made in the compare circuitry, one of the lines 57 will become active and when gated through Gate 68 under the control of the Compare Flip-Flop 64 will set one of the positions of the Level Ring 58, as will be explained later in the example, this level ring controls the highest position for a particular machine word in which a level mark will be placed in the special core planes and controls the subsequent insertion of such level marks and the corresponding positions in the lower order special core planes. The ring itself is a decrementing counter and is again a well known circuit in the art, a specific reference being made to the before referenced Richards' textbook, FIGURE 7–13.

The "Input Clock" C is a conventional single shot multivibrator flip-flop arrangement interconnected as shown in the diagram and is basically a very conventional clock arrangement as used in many synchronous systems. While the specific operations of the individual members of the clock will be set forth subsequently in the example, stages 1–5 essentially control the storage of succeeding characters in the memory buffer register and thus constitute a loop which will be continuous until a second level identifier is detected in a string or until eight characters are stored in the memory buffer register, in which latter case, Stage 6 of the input clock takes over and initiates a storage cycle. Stages 7 and 8 of the clock control the storage of marks in the special core planes and cause the stepping down of the Level Ring 58 as a mark is put in each subsequent level until all such marks are inserted, as again will be set forth specifically in the operating example.

While describing the Level Compare Circuit 56, attention is directed to FIGURE 5 for a more detailed showing. It will be noted that an eight input AND gate is provided for each of the level identifiers, an input from the zero and one lines of the sixteen conductor input cable from Register 6 being connected to appropriate inputs of the AND circuits in accordance with the particular character being checked. Whenever all eight inputs on a line come up into any one of the AND gates, a "Compare" output will appear on the single output from the AND gate. The seven outputs shown correspond to the output lines 57 coming from the bottom of the Level Compare Circuit 59. FIGURE 5a shows the details of conventional flip-flop type circuits which would make up each of the large blocked AND gates of FIGURE 5. The connection of the various input lines to the desired side of the flip-flops is clearly indicated in this figure. It is, of course, to be understood that a reset pulse would be supplied to all of the flip-flops in all of the compare circuits at the end of each compare cycle for obvious reasons.

Section D may best be described by first referring to FIGURE 3 which is a logical schematic diagram in functional block form of that portion of FIGURE 2 designated by the letter D and entitled, "Memory Controls and Memory." This section comprises the Main Memory 900 and the Auxiliary Memory 901, which for purposes of the preferred embodiment is shown to be a set of 2–D memory planes each of which is adapted to store different level identifiers or hierarchical marks as set forth previously. It will be noted that only the lower three planes of such a 2–D memory are shown and are indicated with the particular level identifiers, i.e. ①, ② and ③ which they represent. The figure further shows the principal Memory Address Register 300 from which the address for any read-write operations for both the 3–D and the 2–D auxiliary memory are obtained as is well understood in the art. Also shown are the various decode matrices and core drivers for driving both the X and Y lines in the main or 3–D memory. Additionally described are the means for deriving the drive selection and control for the 2–D portion of the memory also from the Main Memory Address Register 300 as well as the separate means for writing a single bit of information into the 2–D memory on the input cycle and reading a complete line from the 2–D portion of memory on the search cycle as will be explained more fully subsequently. The Memory Buffer Register 96 shown in the figure is the same memory buffer register shown by the numeral 96 in FIGURE 2. As will be well understood by a person skilled in the art, this register may be utilized both for gating information into or out of the Main Memory 900. Register 312 which is a 128 bit register receives the information gated out of the 2–D Memory Planes 902, 904, 906, etc. The binary information in this register is gated upon command to the Register 610 of the search circuitry whose operation is explained subsequently.

To store information in the system, the address for insertion of a bit of information is first put in the Main Memory Address Register 300. This address may be obtained from an auxiliary location as indicated by the Block 301 entitled "availability list" which may simply be an incrementing counter which will start in the word position zero in main memory and index through the full 16,784 words shown in the 128 x 128 main memory array. This type of data storage assignment system is well known in the art and quite conventional.

Assuming that an address is in the Register 300 and a machine word is in the Memory Buffer Register 96 ready for storage, the X portion of the address is decoded through Decode Matrices 540 and 542 and gated through Gates 546 and 544 into the 8 x 16 Core Driver Array 548 which places a half-select pulse on a selected X line in main memory as is well understood in the art. At the same time, the Y portion of the address in Register 300 is decoded by Matrix 541 and its associated gate elements to drive the 8 x 16 Y Core Driver Array 549 which energizes a selected Y line in the 3–D Memory 900 with a half-select pulse. Thus, a machine word is selected in accordance with the particular X and Y lines addressed and the particular data or machine word it is desired to write is gated from the Memory Buffer Register 96 by Gate 908 and drives selected numbers of the Inhibit Drivers 910 in accordance with the machine word stored in the memory buffer register.

Concurrently, with the writing of a machine word from Memory Buffer 96 in Main Memory 900 a bit or "1" will be placed in the corresponding position of the Level Identifier Planes 902, 904, and 906, etc. To accomplish this a half-select pulse is put on the particular X and Y drive lines in the identifier plane which has been selected. The writing of said bit in the 2–D portion 901 of memory in an address corresponding to that of the machine word in Main Memory 900 is accomplished as follows:

The X portion of the address in Memory Address Register 300 is transmitted on line 912 through the 2–D Memory Decode Matrix 914 and gated through Gate 916 into the Write Driver Matrix 918. One of the output lines in Bus 920 will be provided with a half-select pulse in accordance with the X address from the X portion of Memory Address Register 300. The particular level plane into which this half-select pulse is gated is determined by Gates 922, 924, and 926, etc., which are under the control of the Level Ring 58 of FIGURE 2 as was explained previously. Concurrently, with the application of the half-select pulse to a particular one of the X lines of one of the level planes, the Y portion of the address of Memory Address Register 300 is decoded in Decoder 310 and gated into Driver Matrix 552 which will bring up one of 128 Y drive lines in accordance with a particular Y address in the Memory Address Register 300. Driver 552 likewise provides a half-select pulse which will be gated into a selected one of the level identifier planes by means of Gates 928, 930, 932, etc., again under the control of the Level Ring 58 as explained previously. Thus, it will be seen that when a machine word is stored in the 3–D Memory 900, a bit is written into the Special Level Identifier Planes 902, 904, 906 of 2–D Memory 901 concurrently therewith and at the same address as in the main memory. Level identifier marks will also be written into the same location of all the lower level planes associated with such a machine word. In other words, the same address in Memory Address Register 300 is used to store the bits sequentially in the lower order planes of 2–D Memory 901 in exactly the same manner as described above except that the Level Ring 58 will automatically gate the select pulses into the subsequent ones of the identifier planes until the Level Ring 58 is in the zero position. A detailed description of this operation appears in the subsequent input example.

In the search sequence, the reading out of a line of information from a particular level identifier plane and the development of a "begin" and "end" address for a desired string of information constitutes the inventive feature of the search operation since the actual reading out of a word or words from the Main Memory 900 is completely conventional. The unique feature of this portion of the system resides in the manner in which the address for the particular data string to be read out is obtained by using the special level identifier planes. A detailed description of the method by which a line of data from one of the identifier planes will be utilized is explained subsequently both in the general description of Section F of FIGURE 2 and in the particular search example set forth.

It is required by the system that the search begin at a particular place or address in memory as determined by the "program" search instruction, this beginning search location in memory will be gated to the Memory Address Register 300. As explained in more detail subsequently, it is desired to read out the entire X line in which this starting address is contained, therefore, the X address portion from Register 300 is transmitted over line 912 through the Decode Matrix 914 and this time is gated through Gate Circuit 934 to the Driver Matrix 936. Matrix 936 is what is known in the art as a "full select" driver matrix. In other words, it will provide a pulse sufficient in and of itself to cause a switching of the cores without a coincident pulse on the Y drive line. Such operation is likewise well known in the art and will not be described in further detail. For a more complete description of the operation of 2–D memories using both coincident current half-select pulses or single full select pulses reference is made to the book, "Digital Computers," by R. K. Richards, D. Van Nostrand Co., in the chaper entitled, "Magnetic Core Storage." In a manner similar to that described for the input operation one of the 128 lines in Bus 920 is activated by the Driver Matrix 936 and this current is gated into one of the Level Planes 902, 904, 906, etc., in accordance with the particular Gate 922, 924, 926, etc., determined from the search program and stored in Register 528. When the full select pulse from Driver Matrix 936 is applied to, for example, Level Plane 902 for the ① level through Gate 922, the entire X line selected will be read out on the Y lines into Bus 938, which it will be noted serve as sense windings in the read portion and half-select write windings during the input or write portion of the 2–D memory cycle of operation. All of the 128 lines of bus 938 are gated through Gates 304 and 538 through an appropriate Sense Amplifier 940 into the Register 312. Thus, the contents of the particular X line selected and the particular plane selected are stored in the 128 bit Register 312 and may be gated through Gate Circuit 314 to Register 610 of the search ring circuitry.

The auxiliary or 2–D Memory Planes 902, 904, 906, etc., are conventional 2–D core arrays wherein each X and Y line is separately addressable as set forth above. As will be noted in the drawing, one end of the X and Y lines is grounded and the other connected as desired to the various driver matrices through appropriate gating circuits. As will be seen from the above description, it is possible to write individual bits of binary information into the 2–D memory and read information out a line at a time as it is required by the search organization.

This 2–D portion of Memory 901 has been presented as a preferred embodiment of the invention in that it may be readily seen how the X and Y addresses are taken from the Main Memory Address Register 300 and utilized directly through appropriate decoding matrices and driver arrays to select particular positions in said 2–D memory directly corresponding with the position in which a machine word is located or stored in the main memory. However, it is to be understood that this is a description of a preferred embodiment and that other more complicated memory systems could be used, if desired, having appropriate decoding matrices and drivers for selecting a position in said auxiliary memory whose address corresponds unambiguously to a particular address in the main memory.

The Main Memory 900 and its associated control circuitry is a highly conventional 3–D word organized memory containing X and Y windings sense and inhibit windings so organized that a machine word may be written into or read out of the main memory selecting the desired X and Y drivers in the read operation and selected X–Y drive and inhibit drivers in the write operation. The operation of such a word organized core memory is well known in the art and is incorporated in a large number of present day commercial computers. A complete description of such a 3–D memory may be found in the following references; in the above cited book and chapter of R. K. Richards; the article "Computer Memories: A Survey of the State of the Art" by A. Rajchman, page 104 of Proceedings of the IRE, January 1961, vol. 49, No. 1; the article, "A 32,000-Word Magnetic-Core Memory," by Foss and Partridge, page 102 in the IBM Journal of Research and Development, vol. 1, No. 2, April 1957; the IBM 704 and 705 Customer Engineering Reference Manual; and the IBM Customer Engineering Manual for the 7302 Core Storage Unit.

Similarly, specific descriptions of the memory address registers, decode matrices, core driver arrays, etc., disclosed in block diagram form in FIGURES 2 and 3 may be found in the above references.

Since the specific details of operation of a 3–D word organized magnetic core memory are very well known in the art reference is made to any of the above articles for details of timing, reading, writing, deleting, inhibiting, sensing and any other of the conventional operations occurring in such systems.

Generally, the control of the various operations of such a memory unit is determined by the program which states whether information is to feed from external storage into the memory or whether it is desired to read specific data strings at specific addresses out of the memory. Once having received the program instruction, such a memory control system is essentially autonomous and carries out the instruction whether an input or a read out instruction automatically and after carrying out one instruction is ready to proceed with the next program step. The 2–D and 3–D memories shown and described herein are as stated above quite conventional. The Memory Control Clock 101 shown in FIGURE 3 receives essentially four instruction, write 2–D, read 2–D, write 3–D and read 3–D. Receiving one of these signals plus being provided with the proper addresses in the MAR and dates in the MBR the memory automatically performs this required operation in a conventional manner.

As stated previously in the specification, Section A, B, C and D memory and memory controls, comprise the Data Input Section of this system. The Search Sections E, F, G and H will now be described generally with reference still to FIGURE 2, wherein specific details of the operation of each of the specific functional blocks will be described in detail in the specific search example and the timing table for a typical data search instruction.

Section E comprises a Register 516 which contains the starting address of a data string where a search of the hierarchically organized data is to begin. This address is gated upon command to the Memory Address Register 300 in main memory, described previously which provides for the gating out of the proper Y line from the 2–D memory to enable a search of a level identifier in this line. Register 528 stores the particular level which is to be searched, i.e., a circle for a level which again is obtained from Section I to be described. This identifier is decoded in the Decoder 529 which functions to gate an entire Y line from the desired, i.e., ④ special memory plane of the 2–D memory, which operation was described with reference to FIGURE 3 previously.

The identifier count or the number of the identifier to be sensed starting from the beginning address is placed in Register 562 and again is derived from Section I. This count is brought down into the Compare Circuit 638 and compared against the results from the search ring itself 614. The direction of the search whether left or right is likewise determined from the program input and sets Flip-Flop 580. The input to this flip-flop is likewise determined from the programmer.

It should also be noted that a "do search" input is provided to OR Circuit 512 which is a signal or pulse derived from S.S. VIII–J of Section I and it is this input which initiates the actual search cycle. In summary, the information from the Search Instruction Interpretation Unit Section I necessary to initiate the search cycle is the "do search" input, the starting address, the identifier level to be searched, the number of identifier occurrence marks in each level which are to be counted and recognized and finally, the direction in which the search for each identifier is to follow.

Section F includes the search ring and its associated controls and performs the actual searching of the level planes to provide the absolute beginning and end addresses of a particular bit of data being sought.

With the hierarchical level identifier marks stored in the auxiliary planes of Memory Section 901, as described above, a particular string of information may be found, provided its relative position in a data string is known, i.e., by first scanning the core plane associated with the highest order of classification at the beginning address of the data string to find the memory address in which the highest order of classification for the desired information is located, then dropping down to the core in the next highest order plane which corresponds to this address and continuing the search until the required number of data identifiers have been found in this plane; and so on until the desired address is located. Thus a search instruction of the general type might be starting at Address A find the first ①  the second ③ the fifth ② and third ①. Stated in the previously described language this search instruction would appear as $$A①↑1③↑2②↑5①↑3$$

While the search generally proceeds in only one direction, it is possible that the search might also have to be conducted in the opposite direction. For example, suppose it is desired to locate next-to-the-last field in the second record of a particular block of data. Here the search proceeds in the first plane until the second record identifier is found, and then back in the other direction in the next plane until the first field identifier is found.

It is, therefore, seen that the search circuitry for such a memory device must be capable of initiating a search in the cores of the identifier planes, or in any other register in which the identifier bits are stored, at any desired position and should be capable of searching the register in either direction for maximum flexibility. The circuit must also be capable of generating an output signal when a bit is found which signal may be encoded to indicate the corresponding memory address. The search circuit must also be capable of continuing the search to succeeding positions if the located address, i.e., level identifier, is not the desired one.

The search circuit includes a multistage Search Ring 614 into which the binary data content of successive lines of a selected auxiliary plane are gated. The ring thus incorporates a 128 storage register capable of storing the data in a line of the auxiliary plane. Means are provided for applying a sampling or interrogation pulse to said ring at the stage corresponding to the starting address of the search instruction. An output signal will be generated from a sampled stage of the ring if the corresponding stage of the register has a bit therein. A sampling pulse applied to a stage of the ring is normally propagated onto the succeeding stages by search continuing means to sample the register stages associated with these circuit stages but, if a bit is detected in a stage of the register, this sampling pulse propagation is inhibited. If after locating a bit in a given position of the register, it is desired to continue the search onto succeeding positions, means are provided for re-energizing the search continuing means. The search continuing means is capable of continuing the search in either direction depending on the manner in which it is energized, either by a sampling pulse or by said re-energization means.

Referring to FIGURE 2g which is a portion of section F, there may be seen a 128 Storage Register 610 each stage of which may exist in either of two stable states. One of these states will be designated the one state and the other the zero state. When a stage of the register is in its one state, it will be said to have a bit stored therein. The individual stages of the Register 610 may be conventional flip-flops which generate a continuous steady state output when the stage is in its one state, or they may be some sort of pulse generating circuit, such as a magnetic core, which generates an output pulse when it is switched from its one to its zero state. As stated previously with reference to Section D, the contents of any X line of any of the Auxiliary Planes 902, 904, etc., may be read out by a full select pulse and gated through Gate 34 to Register 610.

The outputs from Register 610, whether they be D.C. potential levels or pulses, are applied over lines 612 to corresponding stages of Search Ring 614. The search ring is capable of storing the information contained in Register 610 and of sequentially scanning this stored information until a bit is located. This sequential scanning may be started at any point in the ring and may proceed in either direction. The outputs from stages zero to one hundred twenty-seven are fed to the control loop for requesting the next line of data from the auxiliary plane. In this event the desired bit is not located. This operation is described in detail in the search example. When a bit is located in a stage of the ring, an output signal appears on the line 616 corresponding to that stage of the ring and the scan stops. The scan may be re-initiated starting with the succeeding stage to the right of that in which the bit was located by applying a signal to the line 618 corresponding to the stage in which the bit was found, or the search may be continued starting with the adjacent stage to the left of that in which the bit was found by applying a signal to the line 620 associated with the stage in which the bit was found. A pulse applied to reset line 622 from OR Circuit 623 is operative to reset all the stages of Search Ring 614 at the end of each search cycle or in the event the desired mark is not found in the current search and prepares the ring to search the new contents of Register 610. Specific details of a suitable search ring for use with the system of the present invention will be found in copending U.S. patent application Serial No. 224,966, filed September 20, 1962, of R. F. Schauer.

An output on any line 616 from Search Ring 614 is applied through common line 626 to Counter 628. A signal on a line 616 is also fed to Encoder 630. An input to the Encoder 630 causes outputs on seven of the fourteen lines 632, one line from each pair, to be applied to the seven flip-flops, FF1, FF2, FF4, FF8, FF16, FF32 and FF64 of Address Register 634. A signal on the left line 632 of each pair indicates the presence of a bit in that position and sets the flip-flop it is connected to, to its one state while a signal on the right line indicates the absence of a bit in that position (the not condition) and sets the associated flip-flop to its zero state. Register 634 indicates in which one of the 128 stages of Register 610 the last bit detected was located. The flip-flops of Address Register 634 may also be set by applying signals to seven of fourteen lines 558 coming from Gate 550. This allows the external control circuit to determine where in the Search Ring 614 a particular search will begin.

The contents of Counter 628 are compared in Compare Circuit 638 with a value set in the compare circuit over line 639 from the search program and Register 562. This value is determined by the relative position of the desired information in the data string and is, in the level identifier planes previously described, equal to the number of identifier bits which must be detected before the desired address is found at the identifier level being sampled. When the comparison is successful, a signal goes out to the external control circuitry along line 640 to indicate that the desired address has been found and to, among other things, cause the resetting of the stages of Search Ring 614. When a comparison is unsuccessful, a signal on line 642 is applied to the fourteen AND Gates 644 to gate the outputs from Flip-Flops FF1–FF64 of Address Register 634 through seven of the AND Gates 644 to energize seven of the fourteen lines 646. The lines 646 are one of the inputs to Decoder 648. The other inputs to this decoder are search-right line 650 and search-left line 652. When the search-right line 650 has a signal on it, the Decoder 648 energizes the continue-right line 618 which corresponds to the address stored in Address Register 634. Similarly, when the search-left line 652 has a signal on it, the Decoder 648 energized the continue-left line 620 which corresponds to the address stored in Address Register 634.

The above general description of Section F, the search ring and its associated controls, is general in nature and it is only intended to explain the general function of the circuit. A specific description of the operation of the individual logical elements is presented in the following search example.

Section G is the "Search Clock" and is very similar to the "Input Clock" in that it comprises a series of single shot multivibrators having their inputs and outputs connected as indicated in the drawing of FIGURE 2. The specific detailed operation of this portion of the circuitry again may best be understood by referring to the following search example where a typical search instruction is gone through step by step in conjunction with a timing chart for the search operation.

Section H is merely a storage location containing two Registers 764 and 780 where the results of the search operations are stored. The addresses appearing in these registers are used in a well known manner to actually gate information out of the memory into an arithmetic unit or some other external storage means as may be desired. The manner in which the addresses are derived and stored in those registers is clearly described in the search example set forth subsequently.

Section I as stated previously with reference to the general description of FIGURE 1 comprises the necessary control circuitry for receiving a search instruction interpreting same and providing the necessary search information to the Search Unit Sections F and G in proper time sequence. The principal components of this unit are the Instruction Register 1000 which is provided with a standard Output Control Ring shown as 1002. The register is a multi-stage register each stage of which is capable of holding one of the eight-bit characters or symbols used in the adjectives of the search instructions as outlined previously. It will be noted that the register is shown as an eight stage register since the usual input to the register is from the 3–D memory in which the input instruction is stored as eight character machine words and a machine word is automatically read into the input register at a time. The control ring outputs successive stages of said register in a well known manner upon command of the clock pulse S.S. II–J as will be explained subsequently. Thus, when the next stage of the output ring comes on, it will gate the contents of the associated stage of the Input Register 1000 which as has been stated will place an eight bit binary character on the output line 1004 for this register.

As has been described previously, the instruction adjectives comprise five characters which describe (1) The level of the auxiliary memory in which the particular portion of the search is to be made, (2) The address relative to the beginning address of the data string at which the actual search operation is to begin, (3) The direction in which a search is to proceed from the previous address and (4) and (5) A two digit number in decimal form which is representative of the counts of identifier occurrence marks which must be detected by the search circuitry before the desired address is reached. Similarly as stated previously, the second character or the address indicator may take any one of three forms according to the present invention. The first is a simple address instruction (↑) that the search is to begin at the starting address of the data string and proceed in the prescribed level until the prescribed number of counts has been achieved. The second is the set address instruction (⌘) which states that the search is to begin at the beginning address of the data string and to proceed until the indicated number of counts of level mark occurrences has been detected at which point the then detected address is transferred into the current address storage location of the 3–D memory word provided for this purpose. The third is the current address instruction (¢) that the search is to begin with the current address or the address stored in the special storage location allocated near the beginning of each data string and the search in the prescribed indicators level continued until the desired number of occurrence marks have been detected, the address for this position in memory determined and this address transferred to replace the previous current address in the current address storage location for the data string.

The direction or third character of the adjective as stated previously may either be a right or left search indication (+, −).

The fourth and fifth characters of the adjective are both decimal numbers either of which may be the numbers 0–9.

Decoder 1006 is provided to decode the above characters of the search adjective sequentially as they are gated out of Register 1000. The decoder is of the conventional type well known in the art and briefly comprises a series of flip-flops and AND circuits for detecting whether a particular binary code character causes one of the seven output lines designated as 1008–1020 to become active. For purposes of describing the present embodiment, line 1008 becomes active in the event that the character transferred to the decoder contains any one of the level identifier symbols ①–⑦. Line 1010 becomes active in the event that a simple search instruction is indicated (↑). Line 1012 detects the occurrence of a binary code representation for the current address instruction (¢). Line 1014 detects the binary code occurrence of a set address instuction (⌘). Line 1016 detects a search right indication (+) and line 1018 detects a search left indication (−). Line 1020 gives an indication when a decimal numbers 0–9, used to indicate the occurrence count in the adjective, appears in the output from Register 1000. It will thus be seen that Decoder 1006 performs the function of analyzing and detecting the various symbols used in the search adjectives. If the output of this decoder together with the occurrences from the Clock Portion I which primarily control the operation of the Instruction Interpretation Unit.

It will be readily apparent from the previous description of Sections E, F, G and H which comprise the actual searching mechanism and controls that the only information which need be transferred directly from the Instruction Interpretation Unit, Section I, to the Search Section are the identifier and the identified occurrence mark count. These must be transferred to the Identifier Register 528 and the Count Register 522 respectively from the Instruction Input Register 1000. This is accomplished through the Gate Circuits 1022, 1024 and 1026, respectively. No specific sequential operation of these gate circuits will be provided since such operation will be readily understood from the subsequent description of an instruction interpretation and search example.

Register 1028 entitled the "Operand Register" is used to store the beginning address or operand for any given search instruction. As outlined previously, it is this beginning address of a data string which is necessary with the present system to indicate a starting point for any search operation. This address may be gated from external storage 3–D memory or any other convenient location and is separated by any convenient means (not shown) from the adjective portion of the search instruction which is stored in Register 1000 above. It is, of course, to be understood that the particular operand stored in Register 1028 is that operand which applied to the search adjective sequence which is placed in Register 1000 and interpreted by the present system.

The two other most significant functional elements of the Instruction Interpretation Unit I are the Current Flip-Flop 1030 and the First Count Digit Flip-Flop 1032. The Current Flip-Flop 1030 is set to its "1" condition whenever a set address (⌘) or current address (¢) instruction is detected in the particular adjective being processed by the interpretation unit, which brings up the line indicated "current on." As will be described later, the Current Flip-Flop 1030 together with the AND Circuits 1034 and 1036 which cause the new current address to be written in the special current address storage location for the particular data string in the 3–D portion of the memory.

The First Count Digit Flip-Flop 1032 causes the identifier count from the search adjective to be placed in the proper portion of the Count Register 562. For example, the first digit which would represent the tens digit would be placed in the right-hand half of the Count Register 562 and the second digit or units portion would be placed in the second or left-hand half of the Count Register 562. Flip-Flop 1032 together with AND Circuit 1038 functions to initiate the clock sequence of S.S.–VIIIJ and indicates that the complete adjective has been interpreted and the search cycle is ready. The output of S.S.–VIIIJ thus will initiate a "do search" instruction on line 510 and start an actual search sequence in the search control portion of the system.

The Instruction Interpretation Unit Clock Section I comprises nine single shots numbered 0–8. Their operation will be explained in detail in the Instruction Interpretation and Search Section following together with the Table V which indicates the specific sequential functions of each stage of said clock. However, generally the first stage S.S.–0 J is initiated from the program and actually starts a search instruction interpretation and search sequence. It is operative to gate the beginning address or operand which is indicative of the starting address of the particular data string to be searched from the Operand Register 1028 into the Starting Address Register 516 of the level search control Section F and further initiates the remainder of the clock cycle. Single Shot 1 (S.S. I–J) functions to test if the first member of an adjective sequence is a level identifier, if not, it will indicate that the end of a search sequence has been detected and will appropriately set the last not last Flip-Flop 726 of Section F. Single Shots 2 and 3 (S.S. II–J and S.S. III–J) are effective to sequentially gate out the second, third, fourth and fifth characters of the adjective, properly evaluate them and set up the control circuitry in accordance with such evaluation and initiate what other subsequent operations may be necessary. Single Shot 4 (S.S. IV–J) is effective to read the current address from the special storage location therefor from the 3–D memory and place said address in the Starting Address Register 516. The operation of this portion of the clock, i.e., S.S. IV–J, is, of course, initiated by an adjective instruction using the current address (¢). Single Shots 5, 6, and 7 (S.S. V–J, S.S. VI–J, S.S. VII–J) are operative to store a new current address in the appropriate machine storage location in the 3–D memory and are operative upon the occurrence of either a current address (¢) or set address ($) adjective instruction. Single Shot 8 (S.S. VIII–J) is operative as stated previously to initiate a search sequence after completion of the readout of the fifth adjective character under control of S.S. II–J and S.S. III–J.

It is believed that the above general description of Sections I and J clearly describes the functional operation of the Instruction Interpretation and Control Unit. All of the functional blocks included in FIGURE 2 are well known in the computer arts and could, of course, be readily constructed in tube or transistor versions. Reference is again made to the previously cited publications for detailed descriptions of any one of these conventional computer function blocks.

The following specific Search Instruction Interpretation and Search Example taken together with Tables IV and V which specifically illustrate the functions of both the Search Clock G and Instruction Interpretation Unit Clock J respectively clearly describe this exemplary embodiment of the present invention. While a specific detailed explanation of the operation of every logical block shown in FIGURE 2 will not appear in this example, to attempt to do so would far exceed the benefits to be obtained thereby. It appears that it would be obvious from the specific description of the example together with the Tables IV and V and the very specific nature of FIGURE 2 that the operation of all of the functional blocks will be obvious to a person skilled in the art.

The above description of the Instruction Interpretation Unit, Section I, and the Interpretation Unit Clock Section J may better be understood by referring also to FIGURE 4. This figure is a block diagram of the major components of Section I in which the major functional units are indicated by the reference numerals appended to each block in which the sequence of operations is shown going from the top to the bottom of the figure. As stated previously in the general description of the instruction format, the instruction contains an operand or beginning address for the location of a data string plus one or more adjectives specifying the location of a particular bit of data relative to the operand or beginning address of the string. This instruction is broken up as indicated in the drawing, so that the operand is placed in the Operand Register 1028 and the adjectives are stored in the Instruction Register 1000. The various parts of each adjective are read out sequentially as indicated above and the first portion of the adjective, the identifier, is detected by the Unit marked 1042 and 1044, the identifier level detect and appropriate controls set in the search circuitry. Next, the address indicator is decoded and detected and the appropriate section of Flip-Flop 1030 is set and depending upon the nature of the instruction, the operand address is placed directly in the Memory Address Register 300 or the current address is read out of memory and placed in said memory address register. Next, the search direction is detected in the direction detect and last, the identifier count is decoded and detected in the count detect and appropriate controls in the search section provided. After a complete adjective has been evaluated, and searched a signal comes in on the line marked "from search" going to the bottom of the block entitled "current address modification" and depending upon whether a current address indicator or set address indicator was detected by the "address detected," the current address for the data string will be modified if necessary and upon completion of this step, the next adjective evaluation will begin.

The above description of FIGURE 4, constitutes only a general description of the sequence of events in the Instruction Interpretation Unit which constitutes the subject matter of the present invention. The following example of a Search Instruction Interpretation Sequence and its subsequent execution by the present system will very clearly explain the specific operation of the various functional blocks shown in both FIGURES 2 and 4.

Having thus described the objects and advantages of the present data handling system and having presented a general description of the operations of the various sections of an exemplary embodiment of an entire system embodying the principles of the present invention, there will follow a step by step description of the manner in which data is input into the system and also the manner in which a search instruction is interpreted and carried out. While the inputing operation forms no part of the present invention, it is believed that the following description further clarifies the manner in which data is stored as well as clarifying the data format. Similarly, the details of the search routines per se are separately disclosed and claimed in the above identified U.S. patent application of R. Rice, however, the example of the search routine together with the search instruction interpretation and evaluation more clearly defines the areas in which the present system has utility by way of example.

*Input example*

The following Table (II) is an operational sequence about the "Data Input and Storage" routine of the disclosed embodiment of the invention. The table clearly illustrates the functions of the principal sections of the circuitry including the various stages of the input Clock, shown in Section C of FIGURE 2. The chronological sequence of events is made very clear by the table and an understanding of the detailed description of the Input Example will be greatly facilitated by referring to the same.

TABLE II

*Operational sequence chart for the inputing of data to the system*

Initially:
— Set Output Ring 11 to 1.
— Set MBR Ring 102 to 1.
— Set MBR to nulls.
— Set Compare Counter 62 to 0.
— Set Level Ring 58 to all pos. off.
— Set Compare FF 64 to 0.
— Count of 8 the Input Counter 14 starts clock.

CL–1 —Gate first character in Input Buffer 10 to 6.
— Set up compare circuitry.
— Go to CL–2.

CL–2 —Reset input buffer.
— Subtract one from input buffer counter.
— If compare counter is at 1, set Compare FF to its "1" state.
If first or no compare→CL–3.
If second compare and MBR not on first position →CL–6.
If second compare and MBR ring on first position →CL–9.

TABLE II—Continued

CL-3 —Gate character from 6 to MBR.
  —Go to CL-4.
CL-4 —If MBR ring is on eight position and the compare counter is at 0 or 1→CL-6.
  IF not→CL-5.
CL-5 —Advance output ring.
  —Advance MBR ring.
  —Reset 6.
  —Go to CL-1.
CL-6 —Initiate memory cycle:
  During this memory cycle, the contents of the MBR will be stored in the 3–D memory. If a level identifier has been encountered, it will be stored in the highest plane.
  The "have used memory input" pulse counts down the level ring, resets the MBR to nulls, resets the MBR ring to its first position and goes to CL-7.
CL-7 —If level ring is in its 0 position and compare counter is at two,→CL-9.
  If level ring is not 0→CL-8.
  If level ring is 0 and compare counter is at 0 or 1→CL-1.
CL-8 —Initiate 2–D memory cycle:
  The "have used memory input" pulse counts down the Level Ring 58.
  —Go to CL-7.
CL-9 —Reset Compare Counter 62 to 0.
  —Reset Level Ring 58 to 0.
  —Reset Compare FF 64 to 0.
  —Go to CL-10.
CL-10—Gate 6 to compare circuits.
  —Go to CL-11.
CL-11—Set Compare FF if compare counter is at 1.
  —Go to CL-3.

In describing an input operation, the following string of input data will be assumed to be stored in the input buffer for storage in main memory. In describing the sequence of operation, it will be helpful to refer to Table II as an aid in understanding the various switching sequences involved.

④ A B C D E F G H I ② J K L M N O P ③

This input data string will be stored physically in memory as shown in Table III below according to the teachings of the present invention.

TABLE III

| | | | | |
|---|---|---|---|---|
| ④ | | | ④ | |
| ③ | | | ③ | 2-D level identifier planes |
| ② | | ② | ② | (binary storage, i.e., "1"). |
| ① | | | ① | |
| ④ | H | ② | ④ | |
| A | I | J | ✗ | 3-D portion, each character |
| B | ✗ | K | ✗ | 11 and eight bit binary code, |
| C | ✗ | L | ✗ | therefore, sixty-four bits per |
| D | ✗ | M | ✗ | machine word. |
| E | ✗ | N | ✗ | |
| F | ✗ | O | ✗ | |
| G | ✗ | P | ✗ | |

The table is believed to be self-explanatory. The 2–D portion of each column indicates what level identifier marks have been set in each plane, i.e., a binary "1" for a given 3–D machine word address. The indicator null characters are spaces which are to be ignored. The method for inserting such characters is set forth in the input example following.

In the above string of data it will be noted that the required level identifier ④ is the initiating or first character of the data string to be stored. In describing the storage of this data string, when a subsequent operation is identical to a previous one, it will be so stated rather than completely repeated in a step-by-step fashion.

Referring to the Table II, the initial conditions are set forth. These initial conditions are caused by the "do input" pulse which is supplied from the program. The first eight characters will be gated into the Input Buffer 10 under control of an advance pulse. It is to be understood that this advance pulse steps the Input Ring 12 and properly synchronizes the input data going into the Input Buffer 10 and is a conventional pulse supplied with the data. As each character is entered into the Buffer 10 it is counted by the Counter 14. The Counter 14 is a type of counter which can both add and subtract as is well known in the art. The "advance" pulse is supplied to the incrementing input (not shown) of the counter to effect addition. Subtraction is accomplished by a decrementing pulse appearing on line 72. The counter functions to provide an output on line 222 if the count is between one and seven and an output on line 32, if the count is eight or more.

When the eighth character has been entered into the Buffer 10, line 32 will become active. Line 32 extends to OR Circuit 34 and the output of 34 extends to AND Circuit 36. Flip-Flop 38 is initially set to its one state by the "do input" pulse. Therefore, AND Circuit 36 will have an output which is differentiated by the differentiating Circuit 40 and applied to OR Circuit 42 which turns on the Single Shot 44 which supplies Clock Pulse No. 1 of the clock. Single shots similar to 44 provide clock pulse sources up to and including Clock Pulse 11 and will be referred to as Clock Pulses 1 through 11. During the time that Single Shot 44 is on, a pulse will exist on line 46. Line 46 extends to the AND Circuit 48 and is effective to gate the first character from the Buffer 10 via Channel 50 to the Register 6. An input is also provided to the OR Circuit 52 which enables the AND Circuit 54. The character in Register 6 is thus gated to the Level Compare Circuits 56 and the No. 4 line from this level compare circuit will become active. This will set the fourth position of the Level Ring 58 and also be transmitted through the OR Circuit 60 to set the Compare Counter 62 to a value of "1." It should be observed that the Compare Flip-Flop 64 is initially set to its zero state by the "do input" pulse and thus an output is available on line 66 to enable Gate 68 in order for this 4 to be gated into the fourth position of the Level Ring 58.

When Single Shot 44 goes off, a pulse is transmitted via line 70 to turn on the Single Shot for the No. 2 position of the clock. Line 72 will now become active.

The pulse on line 72 is effective to reset the input buffer and subtract one count from the Input Counter 14. Because the Compare Counter 62 was set to one by the ④, the pulse on line 72 will extend through the OR Circuit 74, the AND Circuit 76, and set the Flip-Flop 64 to its one state. This is done to prevent a second level identifier in a string of eight characters or less being gated into the Level Ring 58. Because the Compare Counter 62 is on its one position, line 78 will transmit its active condition through OR Circuit 80 to AND Circuit 82, where it is ANDed with line 72 to set Flip-Flop 84 to its one state. Line 86 will now become active and provide an input to AND Circuit 88. When the No. 2 Single Shot in the clock goes off, it will transmit a pulse through AND Circuit 88, OR Circuit 90, to the No. 3 Single Shot. Line 92 will next become active. This is effective to enable the Gate 94 to transmit the character in Register 6 to the first position of the Memory Buffer Register 96.

When the No. 3 Single Shot in the clock goes off, it brings up the No. 4 Single Shot to provide a pulse on line 98.

Referring to AND Circuit 100, it will be noted that one input to this AND circuit is from the eighth position of the Memory Buffer Ring 102. At this time, however, the memory buffer ring is on its first position and AND Circuit 100 cannot have an output, therefore Inverter 104 will have an output which is applied to the AND Circuit 106. The line 98 provides the other input to AND Circuit 106 and therefore an output will appear on line 108 which is transmitted to the AND Circuit 122. The other input to AND Circuit 122 is provided by the pulse on line 114 which occurs when the No. 4 Single Shot goes off. At this time AND Circuit 122 will have an output which will trip Single Shot No. 5 and provide an output on line 124. The output on line 124 will advance the Output Ring 12, advance the Memory Buffer Ring 102, and reset Register 6. When Single Shot No. 5 goes off, a pulse will appear on line 126 and extend through OR Circuit 42 to trip the No. 1 Single Shot of the clock. It will be noted that the Single Shots 1 to 5 inclusive of the clock, provide a loop which is used to take consecutive characters from the Input Buffer 10 and place them in the Memory Buffer 6. This loop will be effective eight times unless a second level identifier is encountered or if the special END conditions denoted by a "blank-input" signal appears. These conditions will be explained later.

For the particular data string in this example, the program loop just described will operate eight times and the memory buffer register will contain ⓛ A B C D E F G. On the eighth operation the Memory Buffer Ring 102 will be on its eighth position and line 128 will be active. During Clock Pulse 4 of this eighth operation, line 128 will provide one input to AND Circuit 100. The other input to AND Circuit 100 comes from OR Circuit 80 which has an output because one of the inputs to OR Circuit 80 comes from the No. 1 position of the Compare Counter 62. Because AND Circuit 100 has an output, at the time that line 98 becomes active AND Circuit 130 will have an output on line 132 which extends through OR Circuit 110 and appears on line 112. This causes AND Circuit 116 to become active when the No. 4 Single Shot goes off and a pulse will be transmitted through OR Circuit 118 to trip Single Shot No. 6. This will initiate a memory cycle. During this memory cycle, the contents of the memory buffer register will be stored in the 3-D memory. The ⓛ will be stored in the No. 4 level plane. This combined operation is performed as follows: Because Single Shot No. 6 is active and an output level exists on line 134, this output is applied to the memory controls and will cause the usual 3-D memory cycle to take place. Because the ⓛ identifier is present, the compare counter, as mentioned previously, is on its one position and an output exists on line 78. This output is transmitted through OR Circuit 136 and appears on line 138. 138 and 134 are ANDed by the AND Circuit 140. OR Circuit 142 will thus have an output which initiates a 2-D memory operation. As mentioned before, the 2-D operation and the 3-D operation occur concurrently.

At the end of the memory cycle a "have used memory-input" pulse will appear on line 144. This pulse will step the Level Ring 58 from its fourth position to its third position. It will also reset the memory buffer register to all nulls and reset the Memory Buffer Ring 102 to its first position. It will also extend through OR Circuit 146 to trip Single Shot No. 7. Because the Level Ring 58 is not on its zero position, line 148 will not have an output. Inverter 150 will therefore have an output on line 152. The output of Single Shot No. 7 which appears on line 154 extends to AND Circuit 156, the other input to which is supplied by line 152. An output will thus appear on line 158 to set the Flip-Flop 160 to its one state. This will provide an output on line 162 which extends to AND Circuit 164. AND Circuit 164 will thus have an output when the No. 7 Flip-Flop goes off, to trip Single Shot No. 8. When Single Shot No. 8 is active, a pulse will appear on line 166, which is transmitted through OR Circuit 142 to initiate a 2-D memory cycle. During the cycle the ② will be stored in the No. 3 Level Plane. At the end of this 2-D memory cycle the "have used memory pulse" again appears on line 144 to count down the level ring from its third position to its second position. The same pulse on line 144 extends through OR Circuit 146 to trip Single Shot No. 7 of the clock. It will be observed that Single Shots 7 and 8 constitute another loop which is used to score the level identifiers in the planes lower than the value of the level identifier. For example, in the case of the ④, the ② is stored in the No. 4 plane concurrently with the 3-D memory cycle which was initiated by Clock Pulse 6. Clock pulse 7 tests to see if the Level Ring 58 is on zero or some other position and if the level Ring 58 is not on zero it will cause Single Shot No. 8 to be actuated to initiate another 2-D memory cycle. After the 2-D memory cycle, Clock Pulse 7 is again effective to test the level ring. This minor loop constituting Single Shots 7 and 8 continues until the level ring goes to zero, at which time it is tested by Clock Pulse 7 and an exit from this loop will be accomplished. The manner in which this is done will now be explained in detail. Because the Level Ring 58 is on the zero position, line 148 will be active. The Compare Counter 62 is still on its one position, therefore line 226 will not be active because it extends to the No. 2 position of the compare counter. The Inverter 170 will have an output which extends to AND Circuit 172. The other input to AND Circuit 172 is supplied by line 148. AND Circuit 172 thus furnishes one input to AND Circuit 174, the other input to which is furnished by the pulse on line 154 which is the output of the No. 7 Single Shot. Flip-Flop 176 will thus be set to its one state and line 178 will become active. This line extends to AND Circuit 180, the other input to which is furnished by the pulse which occurs when Single Shot No. 7 goes off. A pulse will thus appear on line 182 which is effective to switch Flip-Flop 38 back to its one state.

Because it is assumed that the output operation is faster than the input, at the end of this string of eight characters the Counter 14 will very likely be at some number less than eight. Line 32 in this case will be down and it will be necessary to wait until this line comes up, which occurs when the count in Counter 14 reaches eight. When line 32 comes up, it will transmit its active state through OR Circuit 34 and extend to AND Circuit 36. Because the other input to AND Circuit 36 is provided by the one state of Flip-Flop 38 AND Circuit 36 will have an output which is differentiated by the differentiating Circuit 40 and applied to OR Circuit 42 which will transmit it to actuate the No. 1 Single Shot of the clock.

In a manner similar to that described previously, the characters H and I will be extracted from the Input Buffer 10 and placed in the first and second positions of the memory buffer register. It should be remembered that the Compare Counter 62 is still standing on 1 as a result of the first level identifier which was a ④. The next character encountered after the 1 is a ②. This character will be gated to the Register 6 from which it will extend to the Level Compare Circuits 56 and an output will appear on the No. 2 line of the level compare circuits. This output will extend through the OR Circuit 60 to advance the compare counter to a count of 2. It will be noted that the No. 2 output of the level compare circuit cannot extend to the level ring because line 66 is down.

The operation just described will occur during Clock Pulse No. 1 Clock Pulse No. 2 will now detect that the Compare Counter 62 is on its second position and also detect the fact that the memory buffer register is not on its first position. This test is accomplished in the following manner: Because the memory buffer register is not on its first position, line 182 will be down. Inverter 184 will thus cause line 186 to be active and provide one input to AND Circuit 188. The other input to AND Circuit 188 comes from the second position of the compare counter and consequently an output will appear on line 190 which furnishes one input for AND Circuit 192. The other input to AND Circuit 192 comes from line 72, which is the second clock pulse. Clock Pulse No. 2 is thus effective through AND Circuit 192 to set Flip-Flop 194 to its one state. This will cause line 196 to become active and provide one input to AND Circuit 198. The other input to AND Circuit 198 is provided when Single Shot No. 2 goes off. AND Circuit 198 at this time will transmit a pulse through OR Circuit 118 to trip Single Shot No. 6. In this manner, a memory cycle will be initiated and during this memory cycle the characters H and I, followed by six nuls, will be stored in the 3-D portion of the memory. No level identifier will be stored during this memory operation. The "have used memory input" pulse will be applied to count down the Level Ring 58 but this pulse is ineffective because the level ring is at zero. It will be remembered that in the previous store operation the level ring was counted down by "have used memory input" pulses which were a result of the successive number eight clock pulses which occurred during the times that the minor loop, consisting of Clock Pulses 7 and 8, were in operation. Therefore, at the end of this memory cycle, during which the characters H, I and six nuls were stored, the clock will be advanced to position No. 7. The Clock Pulse 7 will test for a condition where the level ring is in its zero position and the compare counter is at 2, which is the condition that the machine is in at the moment. Because the Compare Counter 62 is on 2, line 226 will be active and furnish one input to AND Circuit 200. The other input to AND Circuit 200 will be supplied by line 148, which is active because the Level Ring 58 is in its zero position. AND Circuit 200 will now have an output which is applied to one side of AND Circuit 202. The other side of AND Circuit 202 is supplied by Clock Pulse No. 7, which appears on line 154 AND Circuit 202 is thus effective to set Flip-Flop 204 to its one state and the output of 204 will extend via Wire 206 to one side of AND Circuit 208. The other input to AND Circuit 208 is supplied by Single Shot No. 7 when it goes off. The output of AND Circuit 208 will thus be transmitted through OR Circuit 210 to trip Single Shot No. 9. During Clock Time 9, the Compare Counter 62 will be reset to zero, the Level Ring 58 will be reset to zero and the Compare Flip-Flop 64 will be reset to zero. When Single Shot No. 9 goes off, it trips Single Shot No. 10. The output of Single Shot No. 10 extends via Wire 212 to and through the OR Circuit 52 to the Gate 54. In this manner the ②, which is still in Register 6, is transmitted to the Level Compare Circuits 56 and an output will appear on the No. 2 line to set the Level Ring 58 to its No. 2 position and also add one count into the Compare Counter 62 which will thus go to its one position. When Single Shot No. 10 goes off, it will trip Single Shot No. 11, which will produce a pulse on line 214, which extends through OR Circuit 74 and is supplied as one input to AND Circuit 76. The other input to AND Circuit 76 is supplied by the No. 1 position of the Compare Circuit 62. In this manner, the compare Flip-Flop 64 will be set to its one state.

When single shot No. 11 goes off, a pulse will appear on line 216, which extends to the OR Circuit 90 to trip Single Shot No. 3. Clock Pulse No. 3 will gate the ② character from Register 6 to the first position of the memory buffer register. When Single Shot No. 3 goes off, Clock Pulse No. 4 will appear to test the position of the memory buffer ring. Because the memory buffer ring is not on the eighth position, Clock Pulse No. 5 will be initiated. Clock Pulse No. 5 will advance the output ring, the MBR ring, reset Register 6, and return to Single Shot No. 1.

Seven more operations will occur during which the characters J K L M N O and P are transferred from the Input Buffer 10 to the Memory Buffer Register 96. At the end of these seven operations, the Memory Buffer Ring 102 will be in its eighth position, which will cause a memory cycle to be initiated. In this memory cycle, the ② will be stored in the No. 2 plane and the contents of the Memory Buffer Register 96 will be stored in the 3-D portion of the memory. A second 2-D memory cycle will follow, during which the ② is stored in the first level plane, after which Flip-Fop 38 will again be set to its one state.

The last character in the string in this example is a ①. When this character is placed in the Input Buffer 10, it must therefore be in the first position of this buffer. Immediately after this operation, the "blank input" line 218 will be active. This will supply one input to the AND Circuit 220. The other input to AND Circuit 220 will be line 222, which is active when there is a count of one to seven in the Counter 14. AND Circuit 220 will thus have an output which is transmitted through OR Circuit 34, AND Circuit 36, differentiating Circuit 40, OR Circuit 42, to trip Single Shot No. 1. The No. 1 Clock Pulse will thus gate the ① from the Input Buffer 10 to the Register 6 and to the level compare circuits. The ① will provide an output on the No. 4 line of the Level Compare Circuit 56 and this output will be transmitted through the OR Circuit 60 to advance the compare counter to its No. 2 position. This output on the fourth line of the Level Compare Circuits 56 cannot be gated into the Level Ring 58 because line 66 is down. Clock Pulse No. 2 will follow and detect the fact that the compare counter is in its No. 2 position and also detect the fact that the memory buffer ring is on its first position. Because the memory buffer ring is on its first position, line 182 will be active and transmit its active condition to one input of AND Circuit 224. The other input to AND Circuit 224 is provided by the condition of line 226, which extends to the second position of the Compare Counter 62. The output of AND Circuit 224 will thus be transmitted via Wire 228 to one side of AND Circuit 230. The other input to AND Circuit 230 is supplied by Clock Pulse No. 2 over line 72. The output of AND Circuit 230 will thus set Flip-Flop 232 to its one state and an output will appear on line 234 which extends through OR Circuit 210 to trip Single Shot No. 9. Clock Pulse No. 9 will reset the compare counter to zero, reset the level ring to zero, reset the compare Flip-Flop 64 to zero, and go to Clock Pulse 10. Clock Pulse 10 will gate the ① again to the compare circuits and this time the fourth position of the Level Ring 58 will be set and the Compare Counter 62 will advance to its first position. Clock Pulse No. 11 will follow, which will be effective to set the Compare Flip-Flop 64 to its one state and return the clock to Clock Pulse No. 3. Clock Pulse No. 3 will gate the ① from Register 6 to the first position of the memory buffer register and Clock Pulse No. 4 will follow. It should have been mentioned that Clock Pulse 2 subtracted one count from the Input Buffer 14 when the ① was removed from the Input Buffer 10. Consequently, the Input Counter 14 will be at zero. Because the Input Counter 14 is at zero, both lines 32 and 222 will be down and both Inverters 236 and 238 will have outputs which are applied to the AND Circuit 240. As mentioned before, the "blank input" line 218 is up and therefore, AND Circuit 242 will have an output which extends over Wire 244 through the OR Circuit 110 to AND Circuit 116 via Wire 112. The other input to AND Circuit 116 is supplied by Wire 114, when Single Shot No. 4 goes off. Thus, AND Circuit 116 will provide an output which extends through OR Circuit 118 to trip Single Shot No. 6. A memory cycle is thus initiated which will store the ① in the No. 4 level plane and also store the ① followed by seven nulls in the 3–D portion of the memory. Three 2–D memory operations will follow during which the ① is stored in the third, second, and first level planes respectively. At the end of the last 2–D memory operation, Flip-Flop 38 will be set back to its one state and the machine will wait until the next "do input" command is received.

Referring to FIGURE 3, which is a block diagram of the memory organization, the Memory Buffer Register 97 is the main memory input-output buffer and as is well known, stores a machine word read out of memory and writes said word back upon command. This buffer could be the same as Buffer 96 of FIGURES 2a–2f but for the sake of simplicity will be considered separate. The address of a location where a word is to be stored is contained in the Register 300, which is conventionally referred to as the memory address register. The right hand seven bits of this register is the Y address. The left hand seven bits is the X address. These X–Y addresses are decoded in order to control both the 3–D and the 2–D memory operations. The Register 300 is also equipped with circuits to enable it to operate as a counter. For example, if this register is initially at all zeroes and a write operation is initiated, the word to be written will be written in the zero location in memory. Following this first write operation a suitable pulse such as the "have used memory pulse" could be applied to this counter to make it read 00000000000001. The next write operation called for would thus store the second word in the No. 1 location in memory. The addresses which are initially placed in Register 300 and subsequently incremented by successive single counts are determined by other apparatus in the machine and not part of this invention. Such an availability list or available storage location register is conventional, such a scheme for example, is utilized in the above referenced Brown patent or the I.B.M. 704 computer as explained in the Customer Engineering Manual. It can be said that another portion of the machine has the responsibility for creating successive lists of memory locations which can be applied to the Register 300, in order for the machine shown in this patent to operate satisfactorily. (Reference can be made to magazine articles and other publications concerning the operation of standard core memories both of the 3–D and 2–D type and it is believed that all of the devices shown diagrammatically in FIGURE 3 are adequately explained by the above mentioned publications.)

In FIGURE 3, the No. 1 level plane is generally designated with the reference characters 902. It will be noticed that there are two Level Gates, 304 and 928, associated with this Level Plane 302. The Gates 304 and 928 are controlled by the memory controls shown diagrammatically in FIGURE 2c. For example, in the memory cycle, the Gate 304 would be enabled during the "read" portion of the cycle and 928 during the "write" portion. In the foregoing description of the storage of the level identifiers, the pulse which would actually store the level identifier in the No. 1 level plane would arrive over Channel 308. Channel 308 consists of 128 lines, one of which is selected by the Decoder 310 which decodes the Y portion of the memory address into one of 128 lines, thus, at the time a word is stored in main 3–D memory, a bit list or "1" is stored at the corresponding spot of, for example, the ① level plane.

*Search instruction interpretation and execution example*

The following Tables IV and V constitute operational sequence charts for a search instruction evaluation and for a search routine respectively. They clearly set forth the relative time of the events in both sections of the systems and indicate both when and how the various functional elements become operative. The material following the tables is a detailed description of the operation of the logical schematic diagram of FIGURE 2 (i.e., a–j). An understanding of this description will be greatly enhanced by referring to these tables.

TABLE IV

*Operational sequence chart for the search instruction interpretation unit*

Starting conditions:
—Load Instruction Register (IR) 1000 with the search adjectives.
—Reset IR Control Ring 1002.
—Load Operand Register 1028 with the operand.

S.S. 0–J —Gate operand in Register 1028 to Starting Address Register 516.
—Reset last-not last FF 726 to not last.
—Turn on S.S. I–J.

S.S. I–J —If no level identifier present in IR 1000 at this time set "last" condition in FF 726.
—If a level identifier is present in IR 1000, the identified is gated to Register 528.
—Reset Current FF to "0."
—Turn on S.S. II–J.

S.S. II–J —Advance IR 1000 to gate out next character of the search adjective.
—Turn on S.S. III–J.

S.S. III–J—This step evaluates the adjective for the three possible address instructions:
(1) If a "simple address" indication is detected i.e., (↑) return to S.S. II–J.
(2) If a "current address" indication is detected i.e., (¢)
—Set current FF 1030 to "1" or "current on" condition.
—Gate the operand address in Register 1028 to the Memory Address Register.
(3) If a "set address" indication is detected i.e., ($)
—Set current FF 1030 to "1" or "current on" condition.
—Set S.S. II–J.

Note: The above three conditions evaluate the second character of the adjective which will be the address indication ↑, ¢, or $. The next stop of S.S. III–J evaluates the third character of the adjective i.e., the + and — which gives the "search right" or "search left" instruction to the search controls, and the following to operating sequences of S.S. III–J gate the count to the proper portions of the Count Register 562. Since the operation of S.S. IV–J follows the first step of S.S. III–J with a ¢ address detection, its operation will follow:

S.S. IV–J—Access the 3–D memory in accordance with the operand address in the MAR.
—Gate the address in characters 5 and 6 of the MBR (which is the current address) to Register 516.
—Turn on S.S. II–J.

S.S. III–J (second sequence)
—(1) When a search right indication (+) is detected, set direction FF 580 to "search right."
—Turn on S.S. II–J.
—(2) When a search left indication (—) is detected, set direction FF 580 to "search left."
—Turn on S.S. II–J.

S.S. III–J (third sequence and fourth sequence)
—(1) When the first count digit, i.e., number 0–9 is detected, set the FF 1032 to "1."
—Gate said number to one half of the Count Register 562.
—Turn on S.S. II–J.

TABLE IV—Continued

—(2) When the second count digit is detected, set FF 1032 back to "0."
—Gate the second count digit to the other half of Count Register 562.
—Turn on S.S. VIII–J.

Note: Single Shots S.S. V–J, S.S. VI–J and S.S. VII–J control the storing of a "current address" back in the special storage location at the operand address. S.S. V–J is turned on by a signal on line 740.

S.S. V–J —Gate the address in Register 634 to Register 516 (Y portion).
—Turn on S.S. VI–J.
S.S. VI–J —Gate operand address from Register 1028 to the MAR.
—Read out the special storage word to the MBR.
—Turn on S.S. VII–J.
S.S. VII–J —Store address in Register 516 in character positions 5 and 6 of MBR.
—Write MBR back in memory.
—Turn on S.S. I–J.
S.S. VIII–J—Initiate search cycle by providing a signal on the "do search" line 510.

Note: The "request for new adjective" signal on line 740 performs the usual "off" signal from S.S. VIII–J. If the current FF 1030 is on "0," this initiates a new instruction access by turning on S.S. I–J. If the current FF 1030 is in its "1" state, it initiates S.S. V–J.

TABLE V

*Operational sequence chart for the search control circuitry*

Starting conditions:

| —Load Starting Address Register 516. | These operations are accomplished under the control of the Instruction Interpretation Unit |
| —Load Identifier Register 528. | |
| —Load the Count Register 562. | |
| —Load Direction Flip-Flop 580. | |

—Reset "last" or (not last) or "last" Flip-Flop 726 to "0."
—Reset Counter 628 to "0."
CL–1S—Gate starting address to 300.
—Set "end of search" FF to 0.
CL–2S—Gate identifier to memory level controls. Initiates 2–D memory cycle. This reads a row of a level plane to 312.
CL–3S—Gate 312 to Register 610.
—Gate Y starting address to Register 634.
—Gate count to Compare Register 638.
CL–4S—Gate contents of Register 634 to Decoder 648.
CL–5S—Search.
CL–6S—In this clock cycle, five tests are made for compare or no compare upon location of an identifier mark, in conjunction with the states of the overflow flip-flop and the "last or last" flip-flop, as follows:
—(1) If compare (1st cond) and EOS flip-flop is on "0" (2nd cond) and the "last or last" flip-flop is on last (3rd cond) a signal appears on the line labelled "request for new level identifier." In this case, the search clock stops on the sixth clock pulse.
—(2) If compare (1st cond) and EOS flip-flop is on "0" (2nd cond) and the "last or last" flip-flop is on last, (3rd cond) go to CL–8S.
—(3) If no compare and "end of search" flip-flop is on "1," go to CL–9S.

TABLE V—Continued

—(4) If no compare and no overflow, go to CL–4S.
—(5) If overflow, go to CL–7S.
CL–7S—Increment or decrement starting address. Go to CL–1S.
CL–8S—Gate 34 to Y portion of the "begin" or "end" registers.
—Gate X portion of starting address register to "begin" or "end" registers.
—Set EOS flip-flop to 1. Go to CL–4S.
CL–9S—Gate 34 to "begin" to "end" register.
—Gate X portion of starting address register to "begin" or "end" registers.
—The pulse from this No. 9 Single Shot is used to indicate the "search completed."

In the following example of a search instruction interpretation by the present system as disclosed in FIGURE 2, it will be assumed that the programmer must locate the third phrase of the second sentence of the third paragraph from the last current address in the block of data whose beginning address or operand is 503 and further, that he wishes to set a new current address at the point where the second sentence of said third paragraph was located. According to the data and instruction format set forth previously, such an instruction would first look as follows: 503①¢3; ①$2; ②↑3. Thus, this instruction indicates that the beginning address of the data string is 503, that the search in the paragraph levels is to begin not at Address 503, but at the current address for that data string as indicated by the ¢ appearing after the ① level identifier and finally, the fact that a new current address is to be set at the sentence or ② level is indicated by the $. The actual instruction as placed in the machine for the above symbolic instruction would be as follows:

00000111 1 0111  ①¢–03;  ②$–02;  ②↑+03

This particular instruction has merely converted the beginning address for the Data String 503 into a fourteen bit binary address which will automatically address Word Position 503 in the 128 x 128 memory as will be well understood by a person skilled in the art. Likewise, each of the three adjectives in this search instruction have been converted to the five character adjective specified previously, wherein the direction indication, i.e., (+) and a second digit added in front of the count numbers to properly fill out the two digit count as required by the system.

In performing this search operation interpretation plus the actual search, the operand portion of the search instruction, i.e., the operand address in binary form is loaded directly into the Operand Register 1028. The adjectives are loaded directly into the Instruction Adjective Register 1000. Since this register only holds eight characters at a time as the system requires additional adjectives, it will be understood that conventional control circuitry will be activated upon the advancement of the output ring to the No. 8 position to automatically read the remainder of the search instruction out of an external storage source into the instruction adjective register as it is required.

The search instruction interpretation sequence and the actual search cycle are initiated by a pulse appearing on line 1050 which brings up Single Shot 0 (S.S. 0–J). The activation of this portion of the Search Clock J causes the operand or beginning address to be gated to Starting Address Register 516 by AND Circuit 1052. The activation of S.S. 0–J through line 1054 and line 727 also resets the Last-Not Last Flip-Flop 726. In going off, S.S. 0–J provides an output to OR Circuit 1056 which initiates the next Clock Stage S.S. I–J. This clock in going on, resets the Current FF 1030 to zero and also tests the first character to see if it is a level identifier through AND Circuit 1044 which is connected to the output line 1008 of the Decoder 1006. Since in this initial stage of the sequence the Output Ring 1002 for the Register 1000 is on its first position, the ④ level identifier is in the Decoder 1006 which causes an output to be present on line 1008. The coincidence of this output together with the output from S.S. I–J causes an input to Gate Circuit 1022 which causes the ① level identifier to be directly gated to the Identifier Register 528 in the Search Register Section E. S.S. I–J going off causes an input to OR Circuit 1058 which initiates the next Clock Stage S.S. II–J. This circuit going on performs the sole function of advancing the Output Ring 1002 for the Instruction Register 1000 on line 1060 S.S. II–J going off provides one input to AND Circuit 1062 the other input to which is provided by the Inverter Circuit 1064 which is active since Single Shot, S.S. VIII–J, is off. The output of AND Circuit 1062 turns on S.S. III–J. S.S. III–J develops an output on line 1066 which is fed to one of the inputs of AND Circuit 1068. The other input to AND Circuit 1068 is provided by a signal appearing on line 1012 from Decoder 1006. This is because the next character of the first adjective is now in the decoder and is a current indicator, i.e., ₵. AND Circuit 1068 becoming active provides an output on line 1070 and causes AND Circuit 1072 to be activated with OR Gate 1074. This gate is effective to gate the operand or the Binary Number 503 directly from the Operand Register 1028 to the Main Memory Access Memory Address Register 300.

Another output of AND Circuit 1068 also sets the Current Flip-Flop 1030 to its "1" position through OR Gate 1076. S.S. III–J in going off provides one input to AND Circuit 1078. The other input to this AND Circuit is provided on line 1012 from the output of the decoder which is effective to activate S.S. IV–J. S.S. IV–J becoming active, initiates a read cycle in the 3–D portion of memory which will read out the word at Location 503 which address is stored in the Main Memory Address Register 300. Since as stated previously, it is this word which contains the current address in character positions 5 and 6, the current address for this data string is now available in the memory buffer register at this position. The output of S.S. IV–J also provides one input to AND Circuit 1080. The other input is provided from the main memory controls which provide a pulse when the addressed word has been read into the memory buffer register and the memory controls have automatically rewritten the word back into main memory to save the words in the well known non-destructive mode of operation. AND Circuit 1080 thus being activated, provides an output on line 1082 which gates the current address from positions 5 and 6 of the memory buffer register to the Starting Address Register 516 of the search registers in Section E. It will be noted that the original operand stored in Register 516 has now been replaced by the current address from the memory buffer register. If it is to be assumed that the current address stored at the Special Location 503 where the number 1007, the binary form for this number would be 0001111101111 which would be stored in Register 516. S.S. IV–J going off provides an input to OR Gate 1058 which again turns on S.S. II–J. S.S. II–J again advances the Control Ring 1002 and gates the third character of the instruction adjective to the decoder. This third character of the presently analyzed adjective is a + which indicates a search right instruction and will cause line 1016 of the decoder to come up. S.S. II–J going off again activates S.S. III–J in the manner previously described. S.S. III–J this time causes AND Circuit 1046 to become active since inputs are provided on the line 1066 and also line 1016 as mentioned previously. The output of this AND circuit provides a search right signal to be provided on line 1084 to set the Direction Flip-Flop 580 to the search right position. S.S. III–J going off provides an input to AND Circuit 1086, the other input of which is provided on line 1088 from OR Circuit 1090, the input to which is provided by the signal on line 1016 from the decoder. The output of AND Circuit 1086 provides an input to OR Gate 1058 to again initiate S.S. II–J which advances the instruction register to the fourth character position of the search adjective. Since this fourth character is zero, it will cause line 1020 of the decoder to become active, thus providing an activating input to OR Gate 1090 and also inputs to AND Circuit 1038 and 1040. S.S. II–J going off again activates S.S. III–J which provides an input to AND Gate 1040. The third input to this AND gate is provided by the First Count Digit Flip-Flop 1032 which is always assumed to be reset to its "0" position on any initial search. The output of AND Circuit 1040 rests the Flip-Flop 1032 to its one position through a short time delay and also gates the contents or first count digit from the Instruction Adjective Register 1000 to the first half of Count Register 562 through Gate Circuit 1026. S.S. III–J going off provides one input to AND Circuit 1086, the other input to which is provided again on line 1088 from OR Circuit 1090 which was activated by the output one line 1020 thus initiating another cycle of S.S. II–J. S.S. II–J gating the fifth character of the search adjective, i.e., last digit or the number three into the Decoder 1006 again bringing up line 1020. S.S. III–J tests this character by providing an input to AND Circuit 1038, the other two inputs to which are provided on lines 1020 from the decoder and line 1092 from the "1" position of Register 1032. The output of AND Circuit 1038 resets the Register 1032 to its "0" position and also initiates Clock Cycle S.S. VIII–J. S.S. VIII–J provides an input to AND Circuit 1094. It should be stated that line 1020 coming up during the current cycle caused an enabling input to OR Gate 1090 thus providing the necessary input to AND Circuit 1086 as Clock Pulse S.S. III–J went off. The output of AND Circuit 1086 again brings up S.S. II–J which advances the Register 1000 to the first position of the subsequent adjective. S.S. II–J in going off now finds AND Circuit 1062 open since Inverter 1064 is not producing a signal since S.S. III–J is now on. However, the output of S.S. II–J provides the other enabling output for AND Circuit 1094 which provides an output on line 510 and initiates a search cycle in the search cycle in the search portion of the memory, a detailed description of which follows.

It should be noted at this time that the starting address register contains the current address obtained in the manner previously described. The Identifier Register 528 contains the ④ also provided in the manner just described, the count register contains Digits 03. The direction flip-flop has been set to the search right direction and the last-not last flip-flop has been set to the "0" position by line 727 from Clock S.S. 0–J. Thus, all of the information necessary to proceed with a search is provided in the search portion of the system and the do search signal has been provided on line 510 to initiate same. It should also be noted at this time, that since the Current Flip-Flop 1030 is in its "1" position which was set by the appearance of a current indicator ₵. The AND Circuit 1036 has an input provided by the output of the one side of this flip-flop. When the search cycle for the first adjective is completed and the address for the third ④ or third paragraph beginning with the current address in memory, i.e., 1007 has been completed, a signal appears on line 740 which provides a second input to the AND Circuit 1036. The output of this AND circuit initiates Clock S.S. V–J. S.S. V–J coming on causes the address just found and presently stored in Register 634 to be gated to Register 516. S.S. V–J going off, initiates S.S. VI–J. S.S. VI–J causes the operand address to again be gated to the Main Memory Address Register 300 and initiates a read cycle at this address to again make the special current address storage location for the current data string to be available in the memory buffer register. S.S. VI–J going off initiates S.S. VII–J. S.S. VII–J causes the address stored in Register 516 to be gated to the memory buffer register character positions 5 and 6, thus storing the new current address determined from the adjective in the memory buffer register word. S.S. VII–J also causes this word to be written back in main memory again at the operand or starting address location. S.S. VII–J going off provides an input to OR Circuit 1056 which turns on S.S. I–J to initiate a search cycle for the next adjective of the search instruction if there is one.

The search instruction interpretation is the same for the next two adjectives as for the first adjectives with the following exceptions. In the sequence of Clock Pulses S.S. II–J and S.S. III–J wherein the address indicators are evaluated for the second adjective where the set address indicator § is countered line 1014 becomes active providing an enabling input to OR Gate 1090 and also one input to AND Circuit 1096. The other input to AND Circuit 1096 is provided by S.S. III–J. The output of AND Circuit 1096 provides an enabling input to OR Gate 1076 to again set the Current Flip-Flop 1030 to its "1" or current on position. The setting of this flip-flop again provides one input to AND Circuit 1036 but does not in any other way effect the control circuitry. S.S. II–J going off this time again enables S.S. II–J to evaluate the remaining three characters of the second search adjective.

Since the search circuitry will automatically proceed with a search instruction from the previously obtained address of a previous search adjective, the second adjective sequence only need provide the information of the level identifier, i.e., ③ plus the identifier count, i.e., 02. Therefore, an enabling of S.S. VIII–J after the evaluation of the fifth character of the second search adjective will cause the second search cycle to proceed and be completed. Upon completion of the second search cycle, AND Circuit 1036 is again caused to initiate a sequence of S.S. V–J and S.S. VI–J and S.S. VII–J as set forth previously to gate this new current address in the special storage location at Location 503 for the particular data string as set forth previously and required by the search adjective address indicator set address §.

In the third adjective, the second character is a simple address indicator or the ↑. The occurrence of this address indicator causes line 1010 to come up which automatically resets S.S. II–J through OR Circuit 1090, AND Circuit 1086 and OR Circuit 1058 as described previously. It will be noted that this address indicator does not effect the setting of the Current Flip-Flop 1030 but lets it remain in its "0" position to which it was reset by Clock Sequence S.S. I–J. After the search section has completed the third search adjective, the requests for a new adjective again coming in on line 740, this time activates AND Circuit 1034 since the Flip-Flop 1030 is in its "0" position and the "0" position output provides the second input to AND Circuit 1034.

Since the three search adjectives of the present search instruction have been completed, there will appear in the search instruction at the first position of what would normally have been the next adjective, some other character than a level identifier. This character appearing in the decoder during the sequence of S.S. I–J causes an output from AND Circuit 1042 since this time line 1008 is not active thus providing a signal from Inverter 1098 which provides the two inputs to AND Circuit 1042 together with S.S. I–J. The output from AND circuit 1042 provides a signal which sets the last-not last Flip-Flop 726 to its "1" or last position thus initiating another search sequence to find the end address for the particular piece of data being sought in accordance with the procedure explained subsequently relate to the search example.

Having described the specific operation of the search instruction interpretation unit by way of example, a specific description of the search operation as performed by the search circuitry in accordance with a search instruction interpretation will follow. It should be noted that the above search instruction, while containing only three adjectives is believed fully descriptive of the system since it described a search sequence using all three of the possible search address indicators, i.e., a simple address (↑), set address (§), and a current address (¶). As stated in the example in accordance with the address indicator, the proper level identifier for each adjective was gated into the Identifier Register 528 and the proper count gated into the Count Register 562 together with the inputs to the Direction Flip-Flop 580 and the Not Last Last Flip-Flop 726. Also, the proper starting point or starting address for a particular search sequence was automatically loaded into the Starting Address Register 516 whether this was to be the actual operand or data string starting address or the current address as determined from the special storage location therefore in the 3–D memory.

The following example of a search sequence does not utilize the above search example since this example merely would place particular numbers into the various starting condition registers for the search. Therefore, the search sequence will be described more generally, it being stated appropriately that a specific number would be read out of a particular register in accordance with the search instruction.

The search operation is initiated by the "do search" instruction on line 510 from S.S. VIII–J. Referring to FIG. 2 which shows the Search Clock, Section G, this initiating pulse is applied to line 510. It will extend through OR Circuit 512 to trip the No. 1 Single Shot of the search clock. This will result in an output on line 514 which can be referred to as Clock Pulse CL–1S. In addition to starting the search clock, the "do search" instruction sets the starting conditions listed previously. The output on line 514 is used to gate the starting address which is in Register 516 to the Register 300 which is the Memory Address Register of the memory unit through OR Gate 517. Line 514 is applied to the AND Circuit 518 and, as can be seen, the address in 516 will be gated to 300. The No. 1 Single Shot now goes off and produces a pulse on line 520 to trip the No. 2 Single Shot of the clock. Line 522 now becomes active. 522 extends to AND Circuit 524 and the output of AND Circuit 524 initiates a 2–D memory cycle in the memory unit. Line 522 is applied to AND Circuit 526 and is effective to gate the identifier in Register 528 to the memory controls via Lines 530, and OR Circuits 532. The last mentioned controls which extend into the memory control unit over lines 533 are used to enable gates such as 304, 534, and 536. These gates are activated at the proper time during the memory cycle to read out a row of a level plane during the read portion of the memory cycle. This operation will be explained in more detail later. The Gate 538 is also enabled at the proper time by the memory clock so that a read out operation can be performed and the row of bits read out into Register 312.

The way in which the memory is addressed is as follows. The X address is decoded by the Decoders 914 and applied via the Gate 934 to an 8 x 16 array of full select core drivers similar to 548 and 549 designated by the reference character 936. As explained previously, this is conventional circuitry which is used in many core memories of this type. In this manner, any one X driver will be selected which, as shown in the diagram, extends through one of the planes of the 2–D memory. As explained before, which plane is selected is determined by which one of the gates such as 922, 924 or 926 is enabled by the active line 533 to read out of a row of bits from the level plane selected by the identifier in Register 528 and this row of 128 bits is read into the register 312. Gate 538 will be energized by the memory clock during the read portion of the 2–D memory cycle. When the "have used memory search" pulse appears on line 144', it will trip the third single shot of the clock and line 556 will become active. Line 556 extends to Gate 314 and is effective to gate the contents of Register 312 to the Register 610. The line 556 enables Gate 550 in order to gate the Y address from Register 300 to Register 634. Line 556 enables AND Circuit 560 to gate the count which is in Register 562 to the Compare Register 638. When Single Shot No. 3 goes off, it provides a pulse on line 564 which extends through OR Circuit 566 to trip Single Shot No. 4 of the clock. This brings up line 568. Line 568 is used to condition AND Circuit 570 in order to gate the contents of Register 634 to the Decoder 648. When Single Shot No. 4 goes off, it brings up line 572 which trips Single Shot No. 5 and brings up line 574. The output on line 574 is applied to the AND Circuits 576 and 578. The other inputs to AND Circuits 576 and 578 come from the Direction Flip-Flop 580 which, if set to a "1" will cause the search left to be effective and if set to a "0" will cause the search right to be effective. If it be assumed that the Overflow Flip-Flop 582 is in its "1" state and that a search right operation is called for, then AND Circuit 584 will have an output which will be applied to the Decoder 648. The circuits in the decoder will operate in conjunction with the Search Ring 614 as described previously to start the search, one position to the right of the Y address which is in the Decoder 648. This search will extend in the search ring until a level identifier such as specified in Register 528 is encountered. If a level identifier is encountered, an output will occur on line 626 which will increment the Counter 628 one count. The number in Counter 626 is compared with the number in Register 638 and an output will appear on line 586 if they do not compare and an output will exist on line 640 if they do compare. Thus, the Compare Flip-Flop 588 will be set to "0" if the numbers do not compare and will be set to "1" if they do compare. If it be assumed that the first result of the output on line 574 is a "no compare" operation, the Flip-Flop 588 will be set to "0." As will be explained later, Flip-Flop 582, the "overflow flip-flop," will remain in its "1" state. The only result of the output on line 574 will be to set the Compare Flip-Flop 588 to "0." When Single Shot No. 5 goes off, it trips Single Shot No. 6 bringing up line 590. As listed in the table of clock pulses, five tests are made by the output on line 590. Only one of these tests can succeed. The particular one that can succeed in the example shown is the Output 504 from the AND Circuit 592. The pulse on line 590 is applied to AND Circuit 594, the other input to which is supplied by the "1" side of Flip-Flop 582. The output of AND Circuit 594 is applied to one side of AND Circuit 592, the other side of which is set by the "0" state of Flip-Flop 588. In this manner, the pulse on line 590 will appear on line 504. This line 504 extends to Flip-Flop 596 and sets it to a "1" state. At the same time, the pulse on line 504 sets Flip-Flops 598, 700, 702 and 704 to their "0" state. AND Circuit 706 will thus have an output when Single Shot No. 6 goes off which will extend via Wire 708 to OR Circuit 566 and the output of OR Circuit 566 will trip Single Shot No. 4 to again bring up line 568. It should be noted that in the previous search operation, the particular position in which the level identifier is encountered will be transmitted to the Encoder 630 and encoded into an address which is placed in Register 634. The output on line 568 is again effective to gate 634 to the Decoder 648 and when Single Shot No. 4 goes off, it again trips Single Shot No. 5 bringing up line 574 which causes the next search pulse.

Continuing with the example, search pulses must be repeated until the contents of Counter 628 agree with the Compare Register 638. If it be assumed that the second search pulse on line 574 does not find a level identifier in the Search Ring 614, this pulse will emerge from the right end of the search ring on line 710 and be effective through OR Circuits 712 to set the Overflow Flip-Flop 582 to "0." It should be noted that in this case there will be no output on lines 626 which is the input to the Counter 628. A Clock Pulse No. 6 will follow which is the pulse on line 590. The condition which will be sensed as a result of Clock Pulse 6 is the output of AND Circuit 714 on line 506. Line 506 extends to Flip-Flop 702 and sets it to its "1" state at the same time it sets Flip-Flops 598, 700, 596, and 704 to their "0" states. When Single Shot No. 6 goes off, it is now effective through AND Circuit 716 to trip Single Shot No. 7. The output on line 718 will now be applied to AND Circuit 720 the other input to which is conditioned by the search right line coming from the "search right" side of 580. The X address in Register 516 will now be incremented one count. When Single Shot No. 7 goes off, it trips Single Shot No. 1 thus returning the clock to Clock Pulse 1. Clock Pulses 1 and 2 are repeated to bring a new row of the selected level plane to Register 312 and a new memory cycle is initiated. After the memory cycle, Clock Pulses 3, 4, 5, and 6 are brought into operation to bring about a first search of this new row of bits. It will be noted now that because Flip-Flop 582 is on "0" that the output of AND Circuit 576 will be directed to line 722 which starts the search at the left end of the search ring. If it be assumed that a level identifier is found, a pulse will appear on line 626. Let it also be assumed that this pulse causes the Counter 628 to agree with the Compare Unit 638. In this case, a pulse will appear on line 640 and set the Compare Flip-Flop 588 to its "1" state. The test which can succeed as a result of Clock Pulse 6 will be between the Compare Flip-Flop 588, "end of search" Flip-Flop 724, and the "not-last or last" Flip-Flop 726. If Flip-Flop 726 is on "0" which means that the search just completed is not the last identifier in the string a signal must be provided to ask the program for the next level identifier to be searched. This is accomplished in the following manner. Flip-Flop 724 is at "0" which means that line 728 will be active. AND Circuit 730 will thus have an output because its other input is supplied by the "0" side of Flip-Flop 726. This output will extend via line 732 and provide one input of AND Circuit 734 the other input to which is supplied by AND Circuit 736. AND Circuit 736 has an output because Flip-Flop 588 is at "1" and the other side of AND Circuit 736 is supplied by the pulse from the line 590. The pulse on line 590 thus extends through AND Circuit 736, AND Circuit 734, and appears on line 508 to set Flip-Flop 704 to its "1" state. AND Circuit 738 is thus effective when Single Shot No. 6 goes off to provide a pulse on line 740 which is an indication to the program that it must supply a new identifier.

*Last identifier in a string*

The Flip-Flop 726 in this case is set to "1" by the initial conditions which are set up by the "do search" instruction. The search as done by Clock-Pulse CL–5S is the same as previously described, but there will be new conditions to test for during Clock Pulse CL–6S. If it be assumed that the Counter 628 agrees with the Compare Unit 638 as a result of the application of a CL–5S Clock Pulse, then the condition to be tested for by the CL–6S is that of a compare, the "EOS" Flip-Flop 724 on "0" and the Flip-Flop 726 on "1." The test that succeeds in this case is the output of AND Circuit 736, one input to which is line 590 and the other input to which is the Compare Flip-Flop 588 which is on "1." The output of AND Circuit 736 extends via Wire 742 to AND Circuit 744. The other input to AND Circuit 744 comes from AND Circuit 746 which is satisfied by the Flip-Flop 726 being on "1" and Flip-Flop 724 being on "0." An output will thus exist on line 500 which extends to the Flip-Flop 598 to set it to a "1" and at the same time set Flip-Flops 700, 596, 702, and 704 to "0." AND Circuit 748 will thus be enabled when Single Shot No. 6 goes off to trip Single Shot No. 8. This will bring up line 750. Line 750 will extend through the OR Circuit 752 to enable the AND Circuit 644 and apply the contents of Register 634 to the Channel 646. Channel 646 extends to AND Circuit 754 and AND Circuit 756. Because in the earlier part of this description it was assumed that a "search right" operation was in progress, AND Circuit 758 will be enabled by the line 760 which is the "0" output of Flip-Flop 580 and the pulse on Wire 750. The output of AND Circuit 758 will thus extend through OR Circuit 762 to enable AND Circuits 754 and 755 which will allow the contents of Register 634 to be placed in the Y portion of "begin" Register 764 and the X portion of the address in Register 516 to be placed in the X portion of Register 764. The Flip-Flop 724 is changed to its "1" state by the pulse on line 750. When Single Shot No. 8 goes off, it transmits a pulse via Wire 766 and OR Circuit 566 to trip Single Shot No. 4. Clock Pulses 4 and 5 will be repeated and the conditions to be tested for by Clock Pulse CL–6S is that of a no compare condition and the "EOS" Flip-Flop 724 in its "1" state. When this condition occurs, AND Circuit 768 will have an output because one input is the pulse on line 590 and the other input is the "0" side of the Compare Flip-Flop 588. The output of AND Circuit 768 is applied to AND Circuit 770. The other input to which is the "1" side of Flip-Flop 724. An output will thus exist on line 502 which extends to Flip-Flop 700 to set it to its "1" state also set Flip-Flops 598, 596, 702, and 704 to their "0" state. AND Circuit 772 will thus have an output when Single Shot No. 6 goes off to trip Single Shot No. 9 and bring up line 774. Line 774 through OR Circuit 752 enables AND Circuit 644 and also AND Circuit 776. The other input to AND Circuit 776 is the active condition of line 760 because we are describing a "search right" operation. The output of AND Circuit 776 will extend through OR Circuit 778 to enable AND Circuits 756 and 757 which will allow the contents of Register 634 to be placed in the Y portion of "END" Register 780 and the X portion of this address stored in Register 516 to be placed in the X portion of "END" Register 780.

Another important aspect of the present invention lies in the provision of a plurality of current address storage locations for any given data string. The importance of this aspect is that sequential members of any data string may be automatically read out in a predetermined but different sequence using different current address and different adjective instructions. Perhaps the simplest example of such a problem would be in a matrix multiplication where the data string would be a series of numbers each of which, of course, separated by its own level symbol and is, therefore, separately addressable. In such a number matrix, if it were desirable to, for example, multiply the first, second and third numbers of said series by the first, fourth and seventh numbers of said series respectively, the operation could be achieved by means of the present invention in the following way.

Assume that at the beginning of a data string, two current address storage locations are provided at positions A and B and the individual members of the matrix are assumed to have the hierarchical level ②. An instruction of the following type would automatically provide the necessary information to sequentially gate out the numbers for successive multiplications;

First step:

$$A \text{ (operand) } ②¢0 \times B②¢0$$

Second step:

$$A②¢1 \times B②¢3$$

Third step:

$$A②¢1 \times B②¢3$$
$$A②¢1 \times B②¢3, \text{ etc.}$$

It may be seen from the above search instructions that the search ring will have to perform a minimum number of steps to access successive members of the matrix for the arithmetic operation described. Assuming that the first six numbers of the matrix were the numbers 1–16, the operations called for above would automatically access the following numbers of the matrix:

(1) 1×1; (2) 2×4; (3) 3×7; (4) 4×10

Thus, by incorporating the principles of the present invention in the particular way set forth above, i.e., providing a plurality of current address storage locations associated with each machine word each of which is addressable in a manner known to the programmer very unique operations can be performed on certain types of data strings which will greatly simplify both the programming and the machine time necessary to perform the search operations. It should be understood that the above illustration of a matrix multiplication is only one example of a use to which such arithmetic progression type of data accessing can be used. Other examples in which such a system would prove very beneficial would, of course, be obvious to persons skilled in the art.

It should be further noted that the provision of the current address storage location at the data string operand or beginning address is not the only way of accomplishing objects of the present invention but is presented by way of example. Thus, the storage location for the current address does not have to be at the particular operand address as long as it can automatically be determined for any data string from the beginning address for said string.

Further, while the present invention has particular use with a hierarchically organized variable field length data storage and search system as set forth in the present specification, it is to be understood that certain advantages might be gained by using such a system for rapid accessing in even a fixed field length storage system. For example, although the word lengths and field lengths as shown in such a system the provision of a multiplicity of extra registers and counters for keeping track of current addresses would require far more circuitry and be more costly in terms of machine time than the search system provided by the present invention.

It should be fully understood that the specific embodiment shown for the present system is not to be construed in any way as limiting upon the scope of the invention. As set forth specifically, earlier in the specification, other types of memories could equally well be utilized such as the older electrostatic or Williams's tube types as well as thin film cryogenic memories. Similarly, the specific read-write control circuits for such memories vary greatly in number and organization and any memory system capable of parallel read and write operations on a data string of machine word length could equally well be used with the present system concept. The auxiliary memory which has been described as a 2–D core memory in the present embodiment could also take a number of different forms. For example, this section of memory could be a portion of the 3–D memory, i.e., several planes taken in the word organized direction of a 3–D memory and suitable controls utilized to obtain the 2–D addressing effect outlined in the embodiment disclosed. Further in place of sequential read out of the auxiliary planes, it would be possible to access more than one plane at a time and store the information from each in separate registers similar to 610 which could then be accessed on demand from the search controls.

The manner of controlling the adjective interpretation should also be varied both in terms of apparatus and sequencing. For example, the timing could be completely asynchronous using a single input pulse and a multiplicity of checking circuits, etc.

While the invention has been particularly shown and described with reference to preferred embodiments thereof, it will be understood by those skilled in the art that various changes in form and details may be made therein without departing from the spirit and scope of the invention.

What is claimed is:

1. In a computer data storage system including a high speed randomly addressable word organized memory wherein a given data string comprising a plurality of variable field length machine words organized into a plurality of hierarchical level may be addressed at its beginning point by providing the memory organization with a beginning address, said beginning address further giving access to a special memory storage location having sufficient storage space for storing at least one complete X–Y memory address which constitutes a current address, the improvement which comprises a search instruction interpretation system including:

means for selectively accessing this special storage location upon command;
   means for automatically reading out said "current" address stored therein said current address comprising the address of the last portion of data in said data string accessed;
   means for automatically using this address as the starting point for a new search in said data string, and means for automatically storing the address of a new portion of data accessed in the data string in said special storage location.

2. A computer memory search instruction interpretation system as set forth in claim 1 wherein said system includes means for selectively starting a search of said data string at the beginning address or at said current address of said string.

3. A computer search instruction interpretation system as set forth in claim 2 including:

means for providing a plurality of special storage locations for each data string, one for each hierarchical level of said data string, each of said storage locations being separately addressable and adapted for the storage of separate current addresses for a particular level of said data string, and
   means for addressing different ones of said plurality of storage locations on different search cycles to provide for accessing said given data string using a different current address for each cycle.

4. In a computer memory system for storing hierarchically organized variable field length data wherein said data includes hierachical level identifier symbols included in the input data string separating the various hierachies of said data, means for storing said hierarchical data comprising a three dimensional word organized randomly addressable memory whereby said input data is loaded so that only one hierarchical symbol appears in any one machine word, a two dimensional auxiliary storage means associated with said first storage means having a plurality of substantially identical storage planes therein, each plane being adapted for the storage of an occurrence mark for a different hierarchical level identifier and wherein each plane has a storage location corresponding to every machine word storage location in said first memory, means wherein the address of a storage location in any one portion of the auxiliary storage means is directly relatable to the address of this corresponding word storage location in said main memory search control circuitry, means for automatically searching the auxiliary storage means starting at any given address in any of the planes of said auxiliary storage means and for proceeding with a search in either direction therein and means for counting occurrence marks until a desired mark has been found and further means for automatically proceeding with a search in subsequent steps in different ones of said level planes all in a single search operation, the improvement which comprises a search instruction interpretation system for automatically providing a necessary search data to said search system from a search instruction which includes in each instance a beginning address or operand in main memory of a given data string in which the search is to be conducted and one or more search adjectives, each said adjective comprising an indication of the particular hierarchical level plane of the auxiliary memory in which the search is to be made, an indication of the relative address where the particular step of search is to begin, an indication of the direction in which the search is to proceed and the number of occurrence marks which are to be counted before a successful search has been completed and wherein a given search instruction may contain a plurality of such adjectives for describing a sequential search through the auxiliary memory for a desired bit of data, said search instruction interpretation system including:

means for separately storing the beginning address of the data string for a given search instruction;
   register means for storing the adjective portion of said search instruction;
   means for evaluating each search adjective stored in said last named means and including;
   decoder means for automatically providing the search control circuitry with a beginning address for the start of a search, an indication of the plane of the 2-D memory in which the search is to be made, the number of occurrence marks to be counted in a given search sequence and an indication of the direction of the search for each search adjective
   and means responsive to a completion signal from the search control circuitry to automatically repeat said process for consecutive search adjectives until the search is completed.

5. A search instruction interpretation system as set forth in claim 4 including means for automatically detecting when the last adjective of a search instruction has been evaluated and for supplying a signal to the search control circuitry to initiate means for determining the "end" address indicative of the extent of the portion of data within the data string being sought.

6. A search instruction interpretation system as set forth in claim 5 wherein said means for detecting when the last adjective has been evaluated includes compare circuitry means which detects a variation in the usual search instruction format from a hierarchical level identifier to produce an output signal during the evaluation step of the first character of the adjective, said output being detected and conveyed to the appropriate portion of the search control circuitry.

7. A search instruction interpretation system as set forth in claim 4 wherein the means for evaluating each search adjective includes;

means for sequentially reading out each search adjective a character at a time and;
   decoder means effective to produce a different output signal;
   (1) When any of the hierarchical level identifier symbols appears in the character of the adjective being evaluated,
   (2) When a current address indicator appears in the character being evaluated,
   (3) When a set address indicator appears in the character being evaluated,
   (4) When a simple address indicator appears in a character being evaluated,
   (5) When a search right indicator appears in the character being evaluated,
   (6) When a search left indicator appears in the character being evaluated and,
   (7) When any of the digits 0–9 appear in the character being evaluated;
   time control means effective to sequentially gate said characters into the decoder means and for automatically providing the search information in each adjective for the compare circuitry.

8. A search instruction interpretation system as set forth in claim 7 above wherein said control means includes a series of single shot multivibrators so interconnected as to provide all of the timing pulses necessary to accomplish the evaluation of the search instruction input to the system.

9. A search instruction interpretation system as set forth in claim 8 above wherein the same two single shot multivibrators perform the timing functions for advancing the adjective storage register to gate out successive characters of a given search adjective and initiate the neccessary control circuitry to evaluate said character together with the different output signals from said decoder means.

10. A search instruction interpretation system as set forth in claim 9 including compare means effective to cause a flip-flop to be set upon the detection of a current address indicator which automatically causes the address obtained by the search circuitry for that particular adjective to be stored in the special storage location associated with a data string on completion of the indicated search sequence and means for initiating a timing sequence which causes the current address presently stored in the special storage location for the data string to be automatically gated into the starting address register of the search control to initiate the search for the indicated occurrence mark beginning at said previously stored current address.

11. A search instruction interpretation system as set forth in claim 10 wherein said means for automatically storing the current address derived by the search circuitry for the particular search adjective includes a separate timing sequence means set up by said last named flip-flop means which takes the address from an appropriate register in said search circuitry and effects the storage of same in said special storage location addressed by said starting address of said data string, said storage operation being completed before an evaluation of the next adjective is begun.

12. A search instruction interpretation system as set forth in claim 11 wherein the means for detecting a set address indicator in a search adjective includes means for causing said flip-flop to be set to said other condition whereby a new current address determined by the search circuitry for the adjective will automatically be stored in the special storage location.

13. A search instruction interpretation system as set forth in claim 12 wherein the occurrence of a simple address indicator sets control circuitry to initiate decoder means for causing a search to begin at the beginning address of the data string if said indicator appears in a first adjective occurrence in a search instruction or at the most recently determined address of a previous adjective if said indicator occurs elsewhere in the search instruction and means for inhibiting the storage of the address located by the adjective in the special current address storage location.

14. A search instruction interpretation system as set forth in claim 12 including means for deriving a direction of search indication comprising coincidence means for receiving an input from the evaluating clock pulse together with an appropriate output from said instruction decoder, means for applying said direction indication to the search direction control circuitry of the search system.

15. A search instruction interpretation system as set forth in claim 14 wherein the means for evaluating the two digit level identifier count number includes;

flip-flop circuit means whose condition is changed by the occurrence of a signal on the digit detect output of the decoder which is effective to gate the first count digit of the count to a first portion of a count register section of the search system and means operative in response to the occurrence of a second output signal on the digit detect output line of the decoder to cause said flip-flop to be set to its original position and cause the second count digit to be transferred to the second portion of the count register of the search system.

16. A search instruction interpretation system as set forth in claim 15 wherein a plurality of special current address storage locations are provided for each data string, means for separately addressing each of said storage locations by providing a different beginning address or operand for a search instruction utilizing said special address location whereby different current addresses may be stored in said plurality of special storage locations for subsequent search cycles in said data string.

17. A search instruction interpretation system as set forth in claim 16 including means for initiating a given search sequence at the beginning of a data string regardless of which current address storage position is used in defining the search instructions.

References Cited by the Examiner
UNITED STATES PATENTS 3,093,814   6/1963   Wagner et al. _____ 340—172.5

ROBERT C. BAILEY, *Primary Examiner.*

G. D. SHAW, *Assistant Examiner.*